United States Patent
Mukae

(10) Patent No.: US 12,494,844 B2
(45) Date of Patent: Dec. 9, 2025

(54) SATELLITE INFORMATION TRANSMISSION SYSTEM, COMMUNICATION SATELLITE, GROUND FACILITY, AND SATELLITE COMMUNICATION SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 497 days.

(21) Appl. No.: 18/026,121

(22) PCT Filed: May 11, 2021

(86) PCT No.: PCT/JP2021/017812
§ 371 (c)(1),
(2) Date: Mar. 14, 2023

(87) PCT Pub. No.: WO2022/064755
PCT Pub. Date: Mar. 31, 2022

(65) Prior Publication Data
US 2023/0353241 A1    Nov. 2, 2023

(30) Foreign Application Priority Data
Sep. 28, 2020    (WO) .................. PCT/JP2020/036729

(51) Int. Cl.
*H04B 10/118*    (2013.01)
(52) U.S. Cl.
CPC .................................. *H04B 10/118* (2013.01)
(58) Field of Classification Search
CPC .................................................. H04B 10/118
(Continued)

(56) References Cited

U.S. PATENT DOCUMENTS 8,913,894 B2 * 12/2014 Coleman ............ H04B 7/18521
                                                        398/118
9,391,702 B2 *  7/2016 Wyler .................. H04B 10/118
(Continued)

FOREIGN PATENT DOCUMENTS

JP    2011-218834 A    11/2011
JP    2015-524629 A     8/2015
(Continued)

OTHER PUBLICATIONS

Costales; Non-symmetric Satellite Constellation Design, Analysis and Comparison; 2023, Degree project second cycle, pp. 1-53. (Year: 2023).*

(Continued)

*Primary Examiner* — Amritbir K Sandhu
(74) *Attorney, Agent, or Firm* — XSENSUS LLP

(57) ABSTRACT

A communication satellite (20) provided in a satellite information transmission system includes a first optical communication terminal (51C), a second optical communication terminal (52C), a third optical communication terminal (53C), and a fourth optical communication terminal (54C). An Azimuth visual field change range (53B) of the third optical communication terminal (53C) is equal to or more than ±90 degrees with respect to a satellite forwarding direction +X. An Azimuth visual field change range (54B) of the fourth optical communication terminal (54C) is equal to or more than ±90 degrees with respect to the opposite direction of the satellite forwarding direction +X.

14 Claims, 23 Drawing Sheets

(58) Field of Classification Search
USPC .......................................................... 398/121
See application file for complete search history.

(56) References Cited

U.S. PATENT DOCUMENTS

| | | | | |
|---|---|---|---|---|
| 10,707,961 | B2* | 7/2020 | Turner | ................... H04B 7/195 |
| 2014/0016941 | A1* | 1/2014 | Coleman | ............ H04B 7/18521 |
| | | | | 398/121 |
| 2014/0341586 | A1* | 11/2014 | Wyler | ................ H04B 7/18521 |
| | | | | 398/115 |
| 2015/0071645 | A1 | 3/2015 | Coleman et al. | |
| 2017/0324465 | A1* | 11/2017 | Sotom | .................... H04B 10/40 |
| 2019/0028197 | A1* | 1/2019 | Turner | ................... H04B 7/195 |
| 2022/0081132 | A1 | 3/2022 | Mukae | |
| 2023/0031823 | A1* | 2/2023 | Mukae | ............... H04B 7/18519 |
| 2023/0353241 | A1* | 11/2023 | Mukae | ................ H04B 10/118 |
| 2024/0308696 | A1* | 9/2024 | Mukae | .................... B64G 1/66 |

FOREIGN PATENT DOCUMENTS

| | | | | |
|---|---|---|---|---|
| WO | 2017/175696 | A1 | 10/2017 | |
| WO | WO-2020157807 | A1 * | 8/2020 | ........... B64G 1/2429 |

OTHER PUBLICATIONS

Schnecker et al; Satellite-based Positioning, Navigation, and Timing (PNT), May 2022, Naval Information Warfare, pp. 1-34. (Year: 2022).*

International Search Report and Written Opinion mailed on Aug. 3, 2021, received for PCT Application PCT/JP2021/017812, filed on May 11, 2021, 9 pages including English Translation.

International Search Report and Written Opinion mailed on Dec. 15, 2020, received for PCT Application PCT/JP2020/036729, filed on Sep. 28, 2020, 11 pages including English Translation.

* cited by examiner

Fig. 5  INCLINED ORBIT  TWENTY-FOUR ORBITAL PLANES

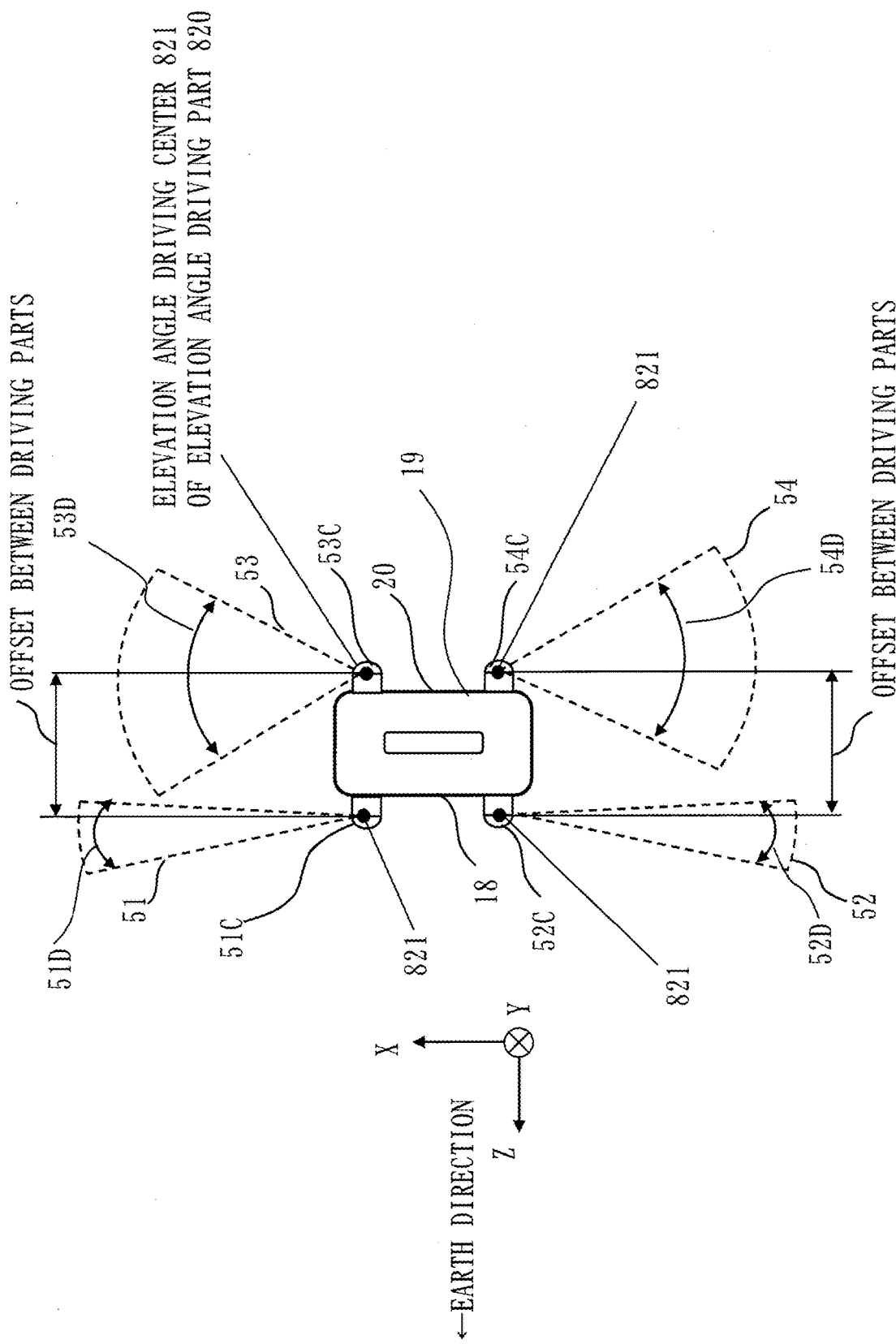

SATELLITE INFORMATION TRANSMISSION SYSTEM, COMMUNICATION SATELLITE, GROUND FACILITY, AND SATELLITE COMMUNICATION SYSTEM

CROSS-REFERENCE TO RELATED APPLICATIONS

The present application is based on PCT filing PCT/JP2021/017812, filed May 11, 2021, and claims priority to PCT Application No. PCT/JP2020/036729, filed Sep. 28, 2020, the entire contents of each of which are incorporated herein by reference.

TECHNICAL FIELD

The present disclosure relates to a satellite information transmission system for transmitting satellite information, a communication satellite, a ground facility, and a satellite communication system.

BACKGROUND ART

There are conventional surveillance systems using satellite constellations (see Patent Literature 1, for instance). When information acquired by such a surveillance system is transmitted to the ground via a transmission system formed of a satellite constellation with a polar orbit consisting of multiple orbital planes or an inclined orbit consisting of multiple orbital planes, there is a problem of difficulty in maintaining a communication circuit without a breakdown because the orbit is laterally changed at the northern extremity or the southern extremity of an orbital plane.

CITATION LIST

Patent Literature

Patent Literature 1: WO 2017/175696 pamphlet

SUMMARY OF INVENTION

Technical Problem

An object of the present disclosure is to provide a transmission system that causes no breakdown of a communication circuit even when the orbit is laterally changed at the northern extremity or the southern extremity of an orbital plane, in formation of a transmission system with a satellite constellation having a polar orbit consisting of multiple orbital planes or an inclined orbit consisting of multiple orbital planes.

Solution to Problem

A satellite information transmission system according to the present disclosure is a satellite information transmission system to relay and transmit satellite information between a user satellite and a ground facilities on the earth. The satellite information transmission system according to the present disclosure is as follows.

Eight or more communication satellites each having inter-satellite communication devices which perform inter-satellite communication are arranged on a same orbital plane and fly in a plurality of orbital planes which are eight or more arranged adjacent to each other, thus forming a satellite constellation, one or more communication satellites of the communication satellites arranged on the plurality of orbital planes have a user communication device which communicates with the user satellite, each of the communication satellites arranged on the plurality of orbital planes includes, when the communication satellite passes northward above the equator with a +X axis direction oriented to a plus direction in right-handed coordinates being taken as a satellite forwarding direction +X of the communication satellite and a +Z axis direction oriented to a plus direction in the right-handed coordinates being taken as a geocentric direction +Z of the communication satellite, a first optical communication terminal as one of the inter-satellite communication devices to perform optical communication with another front communication satellite in a flying direction on the same orbital plane, a second optical communication terminal as one of the inter-satellite communication devices to perform optical communication with another rear communication satellite in the flying direction on the same orbital plane, a third optical communication terminal as one of the inter-satellite communication devices to perform optical communication with another communication satellite flying northeast of an east-side adjacent orbit, and a fourth optical communication terminal as one of the inter-satellite communication devices to perform optical communication with another communication satellite flying southwest of a west-side adjacent orbit, an Azimuth communication visual field of the third optical communication terminal is equal to or more than ±90 degrees with respect to the satellite forwarding direction +X, an Azimuth communication visual field of the fourth optical communication terminal is equal to or more than ±90 degrees with respect to an opposite direction of the satellite forwarding direction +X, a driving part as a driving center of the first optical communication terminal and a driving part as a driving center of the third optical communication terminal are not on a same axis in the satellite forwarding direction +X, and a driving part as a driving center of the second optical communication terminal and a driving part as a driving center of the fourth optical communication terminal are not on the same axis in the satellite forwarding direction +X.

Advantageous Effects of Invention

According to the present disclosure, a surveillance system capable of always performing surveillance over the entire globe with a small number of satellites and having high surveillance performance, such as spatial resolution and surveillance performance, can be provided.

BRIEF DESCRIPTION OF DRAWINGS

FIG. 23 is a diagram of Embodiment 1, illustrating an offset between Elevation angle driving parts 820.

DESCRIPTION OF EMBODIMENTS

Figure 1:
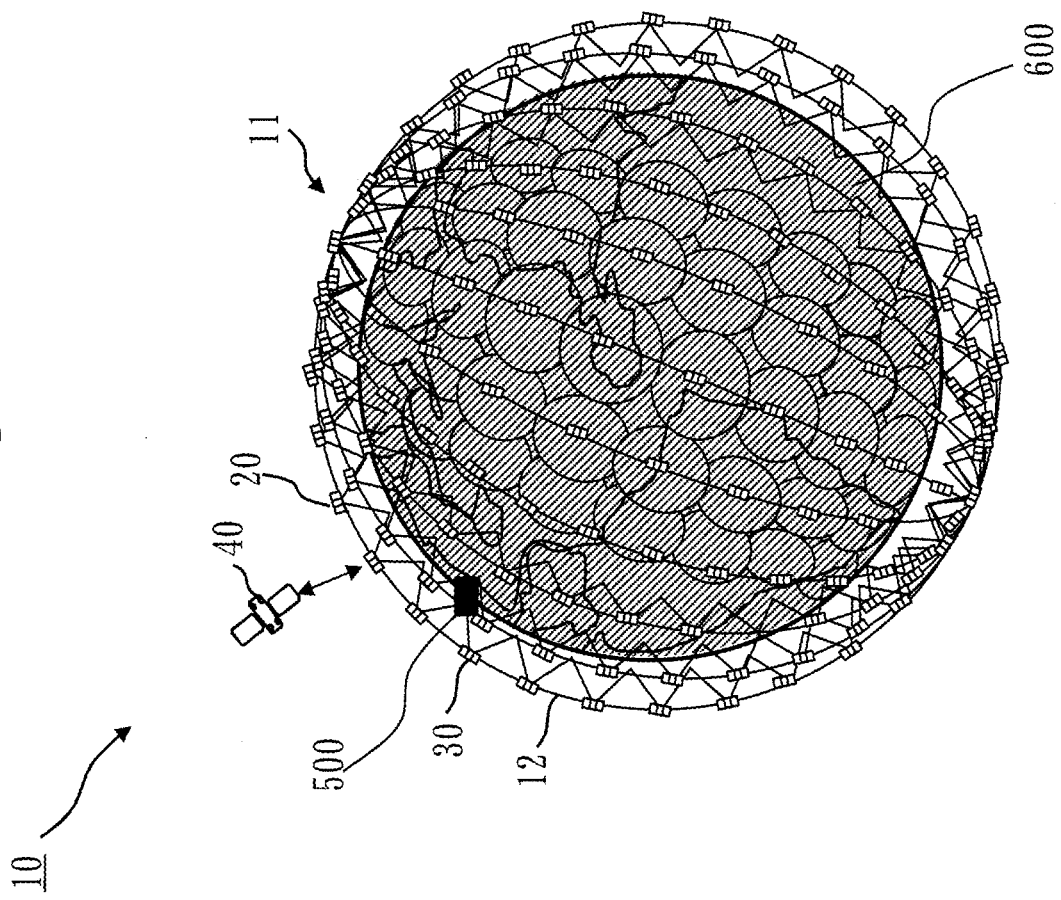
FIG. 1 is a diagram of Embodiment 1, illustrating a satellite information transmission system 10.

In the following, an embodiment is described by using the drawings. Note that identical or corresponding portions in each drawing are provided with the same reference characters. In the description of the embodiment, description of identical or corresponding portions is omitted or simplified as appropriate.

Embodiment 1

*Description of Structure*

For the following embodiment, a forwarding direction and a geocentric direction of a satellite are defined as follows. An +X axis direction oriented to a plus direction in the right-handed coordinates is defined as a satellite forwarding direction +X of the satellite, and a +Z axis direction oriented to the plus direction in the right-handed coordinates is defined as a geocentric direction +Z of the satellite.

In Embodiment 1 described below, arrows indicated over communication satellites in the drawings represent the flying directions of communication satellites.

Referring to FIGS. 1 to 7, a satellite information transmission system 10 will be described. For the satellite information transmission system 10, orbital planes 12 are assumed to be polar orbits or inclined orbits.

<Satellite information transmission system 10>

FIG. 1 illustrates the satellite information transmission system 10. The satellite information transmission system 10 is a system that relays and transmits satellite information between a user satellite 40 and a ground facility 500 on the earth 600. In the satellite information transmission system 10, eight or more communication satellites 20 are arranged on the same orbital plane 12 and fly in a plurality of orbital planes 12 which are eight or more arranged adjacent to each other, thus forming a satellite constellation 11. While in FIG. 1 about 30 communication satellites 20 are arranged on one orbital plane 12, at least eight communication satellites 20 may be arranged on the same orbital plane 12. The communication satellites 20 each have inter-satellite communication devices that perform inter-satellite communication. One or more communication satellite(s) 20 of at least 64 communication satellites 20 arranged on the plurality of orbital planes 12 have a user communication device which communicates with the user satellite 40. Those communication satellites 20 that have user communication devices will be denoted as communication satellites 30 hereinafter. The communication satellites 20 may also include ground communication devices to communicate with the ground facility 500.

<Inter-Satellite Communication Device>

In Embodiment 1 below, a first optical communication terminal 51C, a second optical communication terminal 52C, a third optical communication terminal 53C, and a fourth optical communication terminal 54C will be presented. They are inter-satellite communication devices. In Embodiment 1 below, a ground communication device 61C and a user communication device 62C arranged on the communication satellite 30 are also presented.

<Overview of Inter-Satellite Communication>

Figure 2:
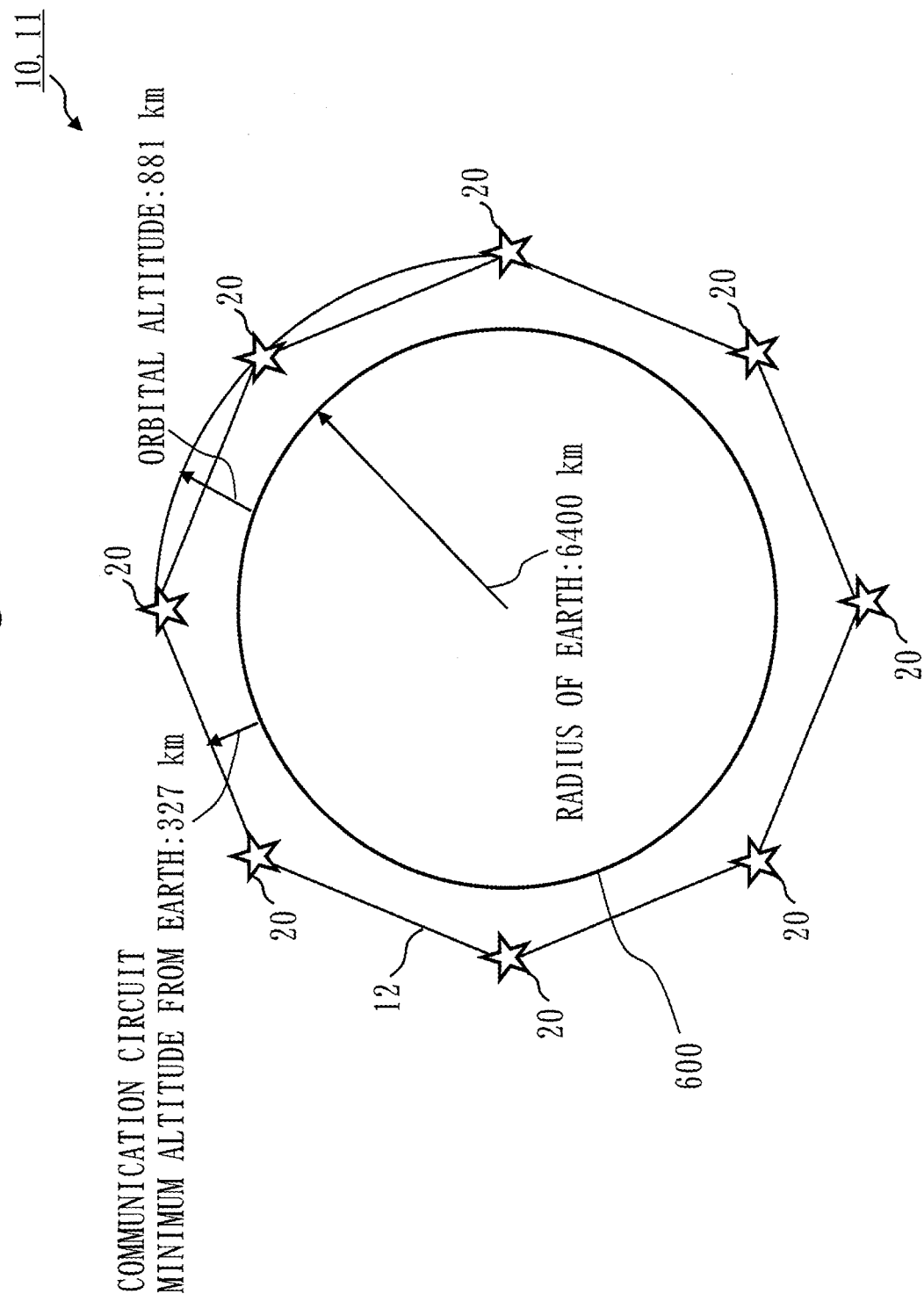
FIG. 2 is a diagram of Embodiment 1, illustrating a state in which eight communication satellites 20 are arranged on an orbital plane 12.

FIG. 2 illustrates a state in which eight communication satellites 20 are arranged on the orbital plane 12. When eight or more communication satellites 20 are uniformly arranged on one orbital plane with an orbital altitude equal to or more than 300 km and one communication satellite 20 communicates with front and rear communication satellites 20, a communication circuit with the communication satellites 20 continuously communication-connected can be formed. If any communication satellite 20 communicates with the ground facility 500, the satellite information of any communication satellite 20 arranged on the orbital plane 12 can be transferred to the ground facility 500. If the number of satellites is small, a communication path and the earth surface tangent become closer in distance, and it is thus required to increase the orbital altitude. If many satellites are arranged, a communication circuit can be formed without receiving atmospheric influences if the orbital altitude is at least 300 km.

Figure 3:
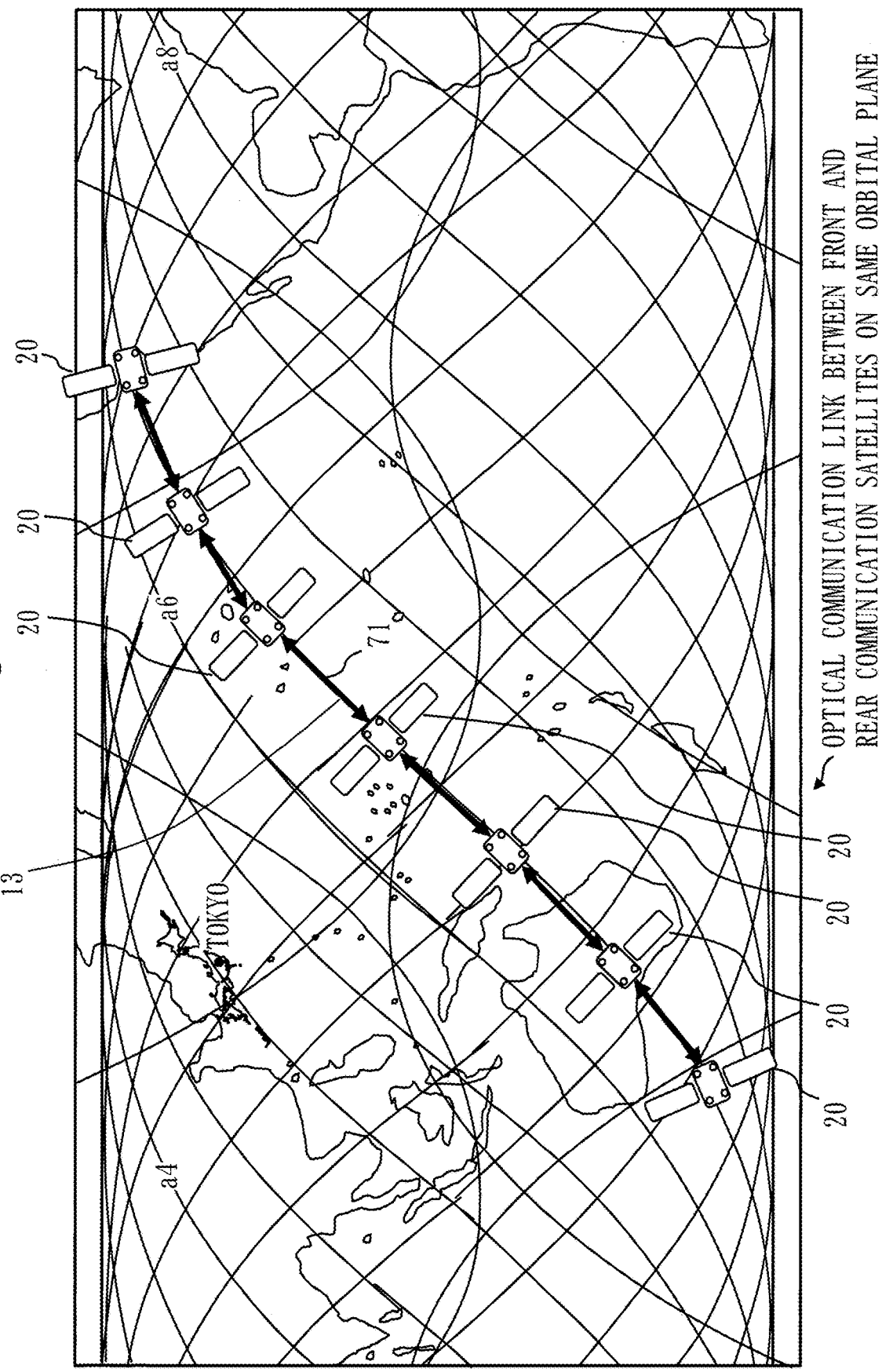
FIG. 3 is a diagram of Embodiment 1, illustrating an optical communication link 71 between front and rear communication satellites on the same orbital plane.

FIG. 3 illustrates an optical communication link 71 between front and rear communication satellites among the communication satellites 20 on the same orbital plane 12 of an inclined orbit. With many orbits 13 which are inclined orbits and formed as in FIG. 3 being uniformly arranged in the longitudinal direction to form a communication circuit also with a communication satellite in adjacent orbit, a communication network covering the entire globe can be formed.

Figure 4:
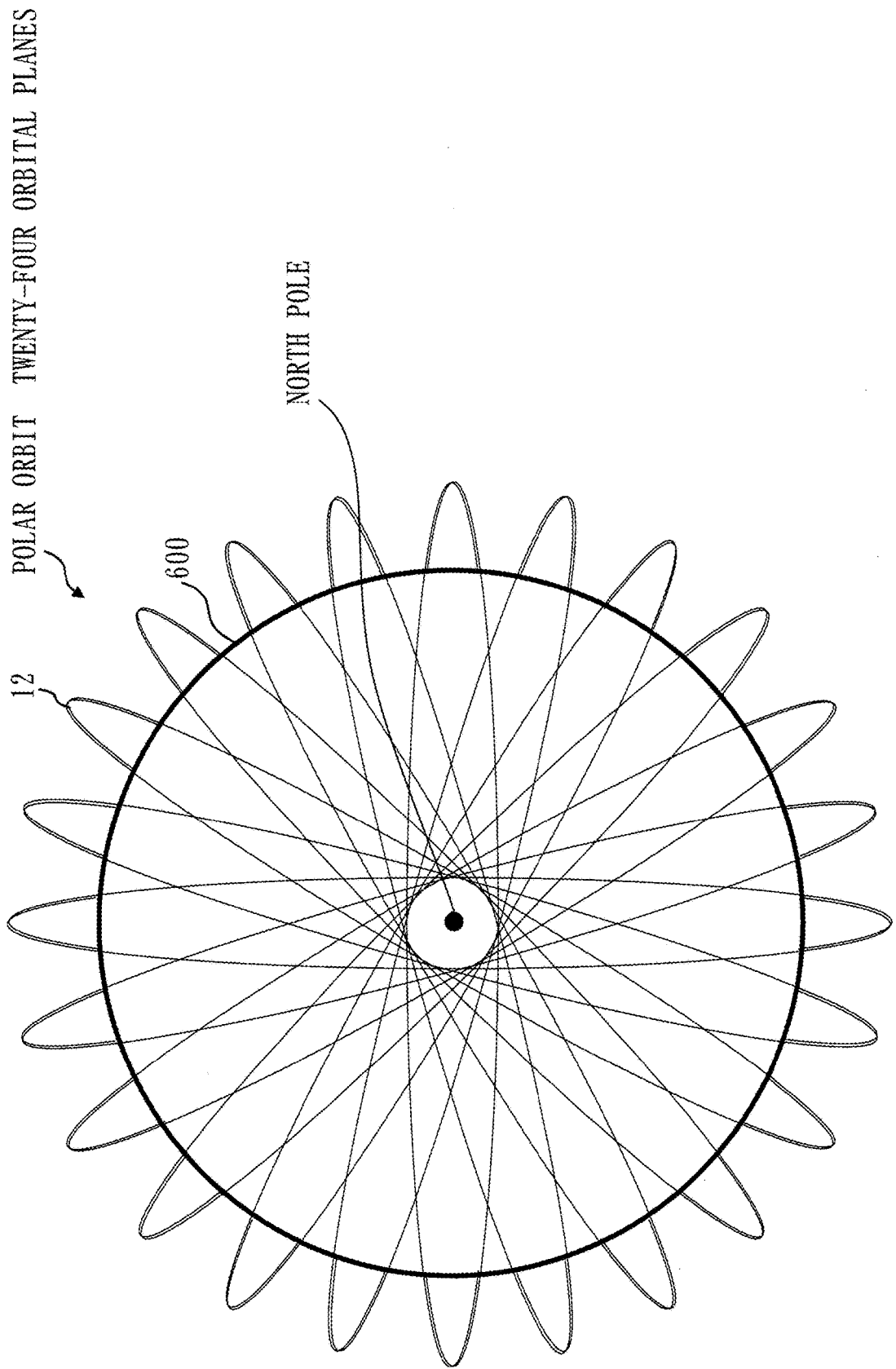
FIG. 4 is a diagram of Embodiment 1, in which a polar orbit having twenty-four orbital planes 12 is viewed from the North Pole side.

FIG. 4 is a diagram in which a polar orbit having twenty-four orbital planes 12 is viewed from the North Pole side.

Figure 5:
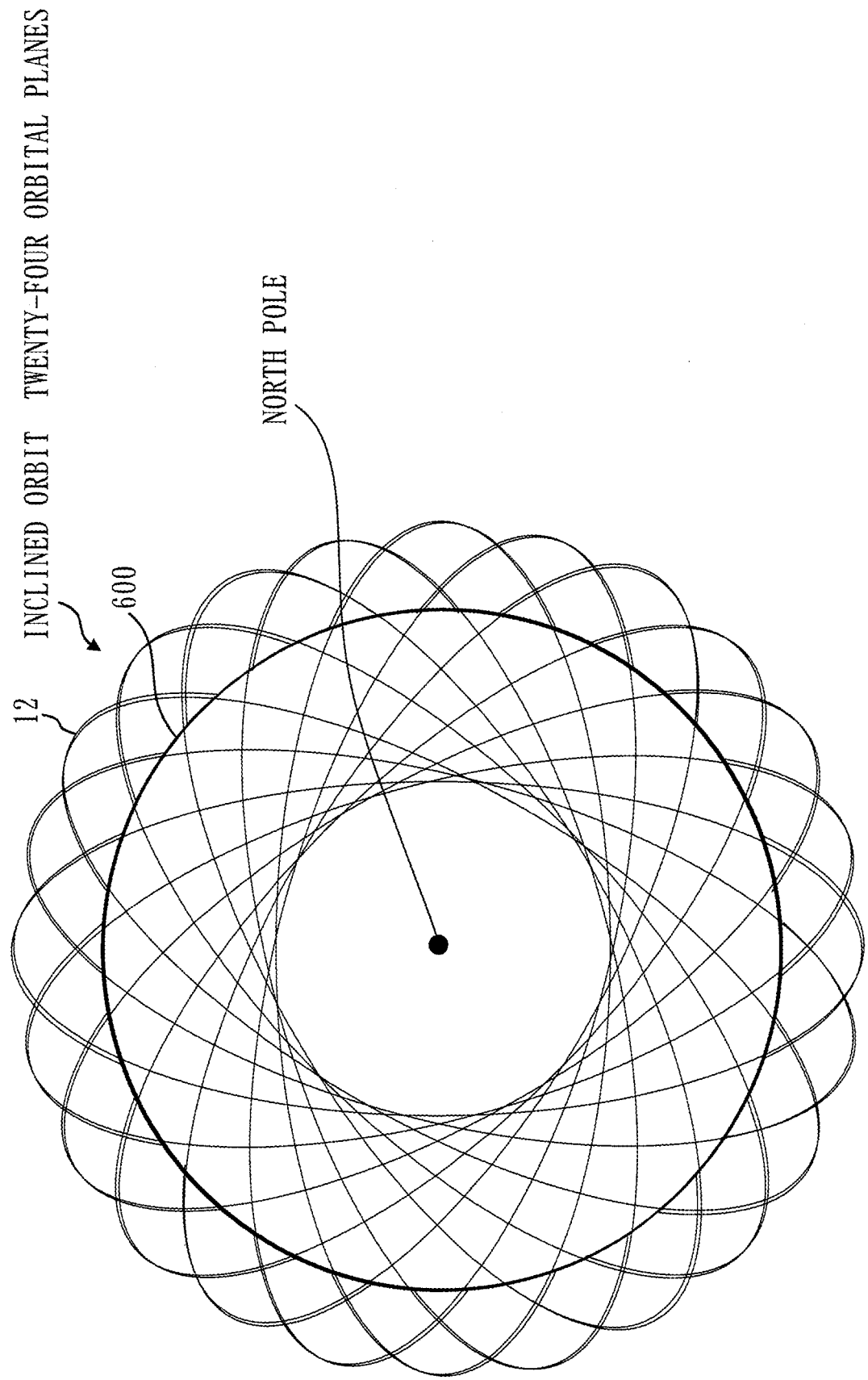
FIG. 5 is a diagram of Embodiment 1, in which an inclined orbit having twenty-four orbital planes 12 is viewed from the North Pole side.

FIG. 5 is a diagram in which an inclined orbit having twenty-four orbital planes 12 is viewed from the North Pole side. In the polar orbit or the inclined orbit, a relative distance from an adjacent orbit is maximum above the equator. With eight or more orbital planes, communication between adjacent orbits can be performed. As the number of orbital planes increases, a communication circuit is established even at a lower orbital altitude. In the case of the polar orbit illustrated in FIG. 4, a heavily-congested areas of communication satellites occur in a polar region, but no intersection of orbital planes occurs in a mid-latitude zone. On the other hand, as illustrated in FIG. 5, in the case of the inclined orbit, heavy congestion in the polar region is mitigated, but many intersections of orbital planes are present in the mid-latitude zone. Each communication satellite is connected via the optical communication link 71.

Figure 6:
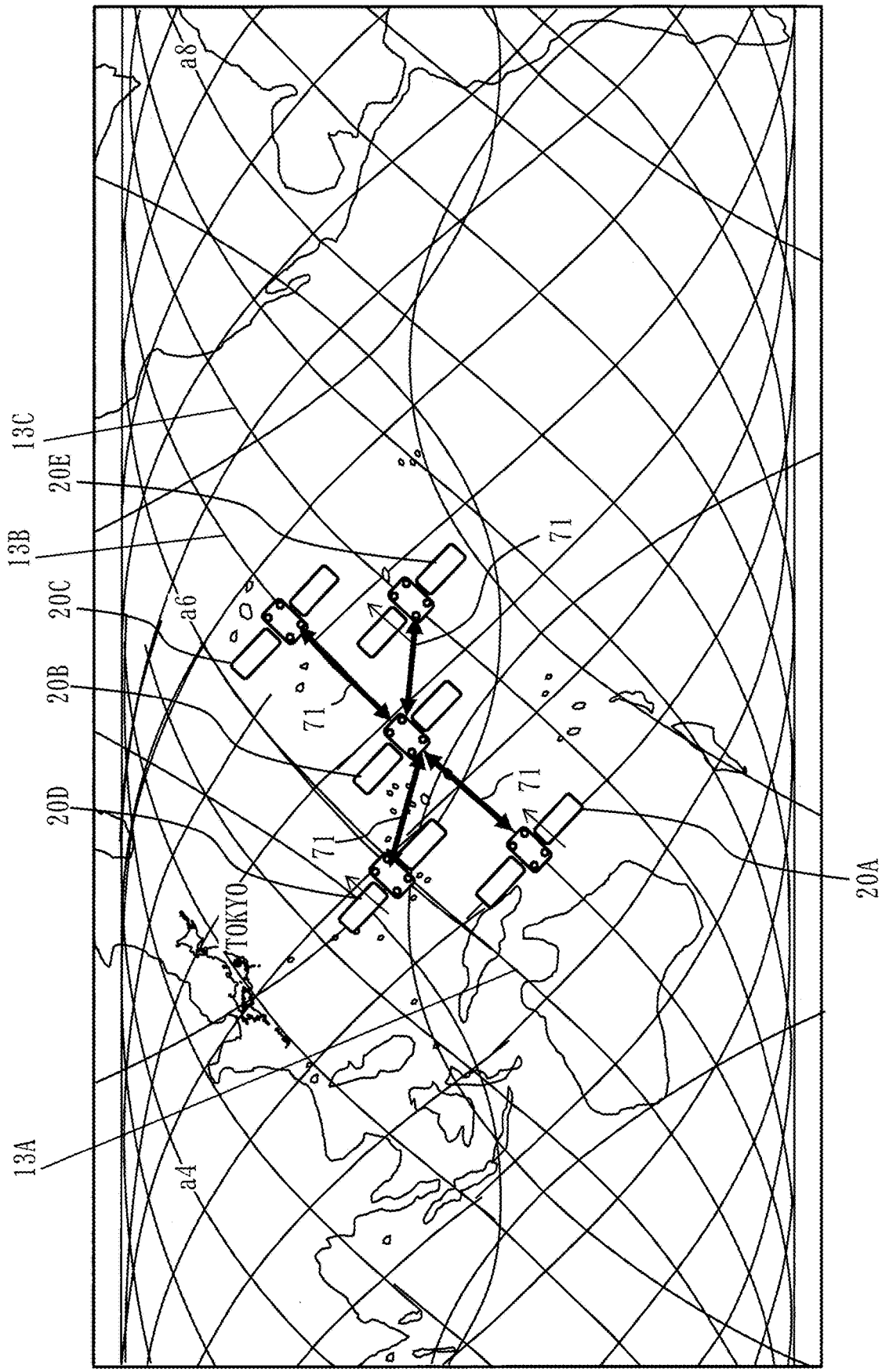
FIG. 6 is a diagram of Embodiment 1, illustrating a situation in which a communication satellite 20B performs optical communication with communication satellites 20A and 20C and performs optical communication with a communication satellite 20D and a communication satellite 20E.

FIG. 6 illustrates a situation in which a communication satellite 20B in an orbit 13B performs optical communication with front and rear communication satellites 20A and 20C and performs optical communication with a communication satellite 20D in an adjacent orbit 13A and a communication satellite 20E in an adjacent orbit 13C.

Figure 7:
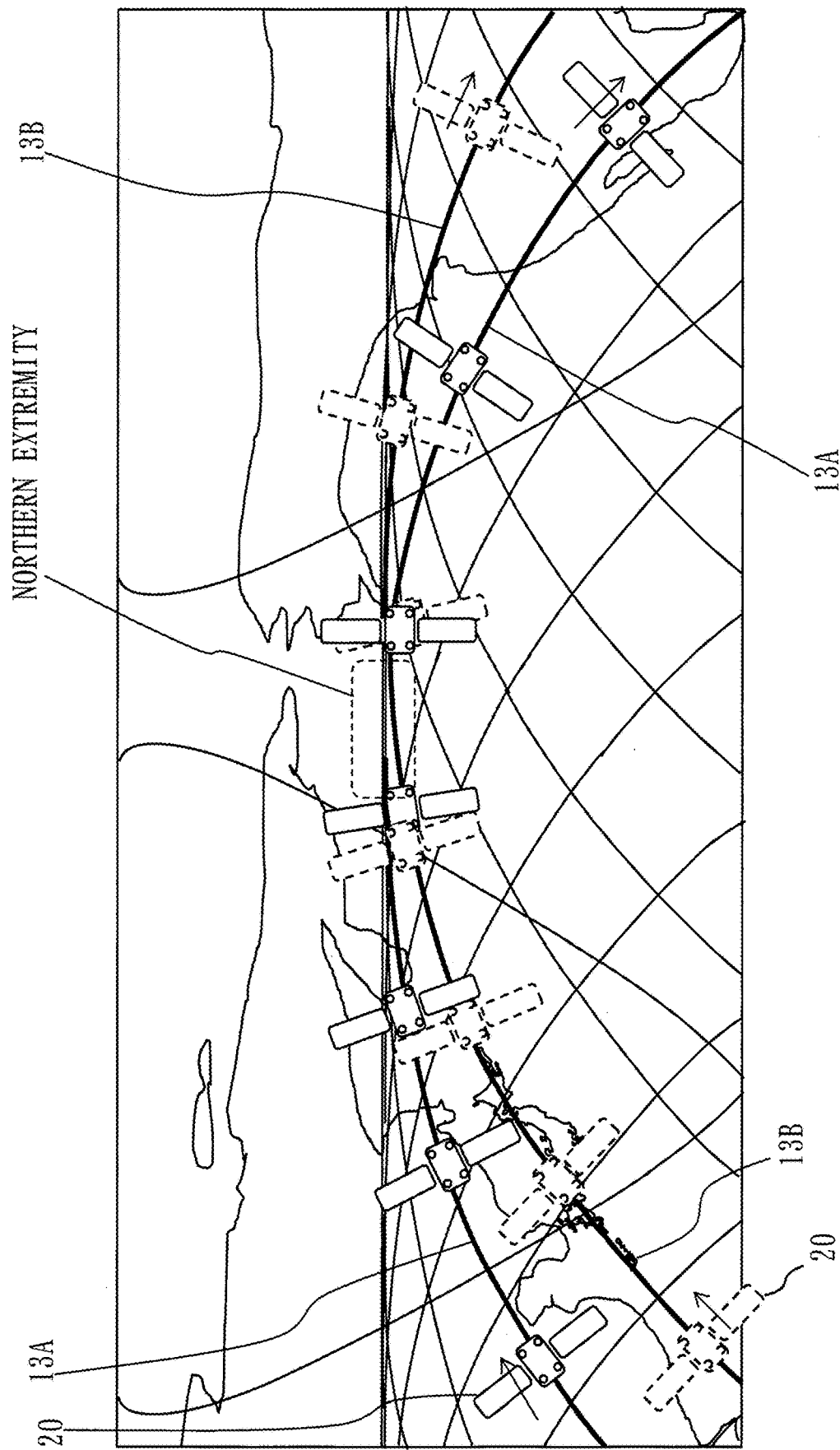
FIG. 7 is a diagram of Embodiment 1, illustrating changes in position of the communication satellites 20 flying in an orbit 13A and an orbit 13B of the inclined orbits.

FIG. 7 illustrates changes in position of the communication satellites 20 flying in the orbit 13A and the orbit 13B of the inclined orbits. The communication satellite 20 flying in the orbit 13B is indicated by broken lines. Before arriving at the northern extremity, the communication satellite 20 in the orbit 13B is positioned on the right with respect to the flying direction of the communication satellite 20 in the orbit 13A. And, after the communication satellite 20 in the orbit 13A and the communication satellite 20 in the orbit 13B pass over the northern extremity, the communication satellite 20 in the orbit 13B is positioned on the left with respect to the flying direction of the communication satellite 20 in the orbit 13A.

As illustrated in FIG. 7, as for a communication circuit with an adjacent orbit in polar orbits and inclined orbits, there is a problem in which since the orbit is laterally changed at the northern extremity or the southern extremity of the orbital plane, it is difficult to maintain the communication circuit without a breakdown.

Also, as illustrated in FIG. 5, there is a risk of collision of satellites at an intersection of orbital planes occurring in the mid-latitude zone in inclined orbits. To avoid the collision risk, collision avoiding measures of changing the orbital altitude for each orbital plane is effective. In this case, there is a problem in which since the ground speed of the communication satellite varies for each orbital plane, this makes it difficult to maintain the communication circuit with the communication satellite in the adjacent orbit as time elapses.

The satellite information transmission system 10 of Embodiment 1 is a system which solves these problems. In the satellite information transmission system 10, the communication satellite 20 flying in an orbit communicates with the communication satellite 20 flying in an adjacent orbit as follows. The communication satellite 20 communicates with a communication satellite in an east-side adjacent orbit in a northeast direction, and communicates with a communication satellite in a west-side adjacent orbit in a southwest direction. Also, the communication satellite 20 ensures a communication visual field at ±90 degrees or more in an Azimuth rotating direction with respect to the satellite forwarding direction +X. This allows the communication satellite 20 to avoid a communication breakdown at the time of laterally changing the adjacent orbital plane.

By changing the orbital altitude for each orbital plane, a satellite collision is avoided. In this case, by dynamically changing the orbital altitude, an average orbital altitude is maintained, thereby avoiding a communication circuit breakdown due to a difference in ground speed for each orbital plane. There is an effect in which, by maintaining the average orbital altitude, communication with an adjacent orbit satellite can be always maintained and a collision between satellites can be avoided.

Figure 8:
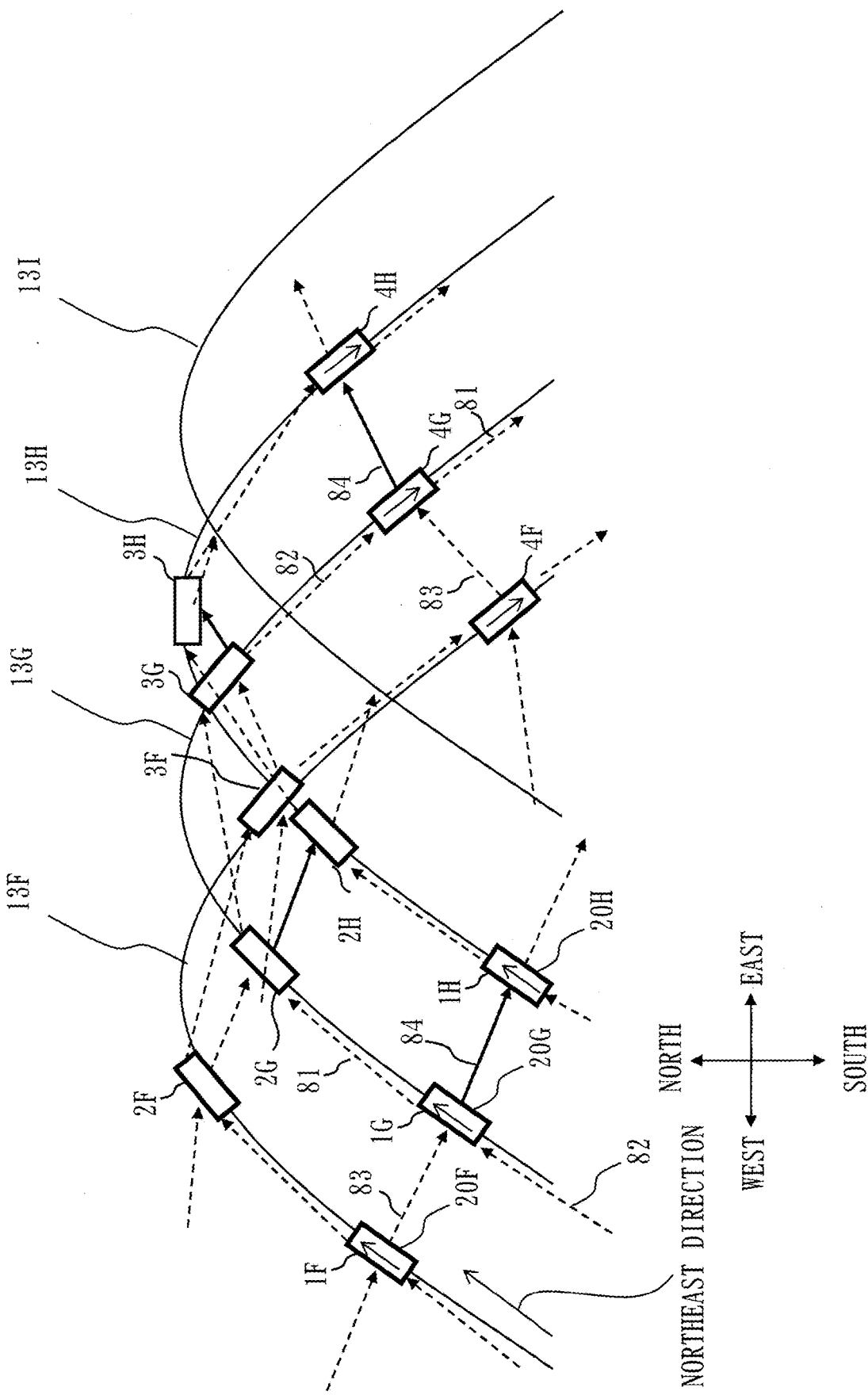
FIG. 8 is a diagram of Embodiment 1, illustrating inversion in a communication direction occurring due to a lateral change of the orbit at the northern extremity of the orbital planes.

FIG. 8 is a diagram illustrating inversion in a communication direction occurring due to a lateral change of the orbit at the northern extremity of the orbital planes. The orbits in FIG. 8 are inclined orbits. The communication satellites 20 flying in an orbit 13F, an orbit 13G, and an orbit 13H are distinguished as a communication satellite 20F, a communication satellite 20G, and a communication satellite 20H. In the orbit 13F, the positions of the communication satellite 20F with elapse of time are indicated as a position 1F, a position 2F, a position 3F, and a position 4F. The same goes for the orbit 13G and the orbit 13H. As for the communication satellite 20G at a position 1G, the communication satellite 20G is connected via an optical communication link 81 to the front communication satellite 20 not depicted in the flying direction and is connected via an optical communication link 82 to the rear communication satellite 20 not depicted in the flying direction. Also, the communication satellite 20G is connected via an optical communication link 83 to the communication satellite 20F at the position 1F adjacently flying in the orbit 13F and is connected via an optical communication link 84 to the communication satellite 20H at a position 1H adjacently flying in the orbit 13H. As for the communication satellite 20G, the connection with the communication satellite 20F is the optical communication link 83, and the connection with the communication satellite 20H is the optical communication link 84. In FIG. 8, the optical communication link 84 is indicated by a solid line.

As time elapses, the positions of the communication satellite 20F, the communication satellite 20G, and the communication satellite 20H become a position 4F, a position 4G, and a position 4H, respectively. Here, as for the optical communication link 84 indicated by the solid line, the optical communication link 84 at the position 1G is on the right with respect to the flying direction of the communication satellite 20G. By contrast, at the position 4G after passage over the northern extremity of the orbit, the optical communication link 84 is on the left with respect to the flying direction of the communication satellite 20G.

Figure 9:
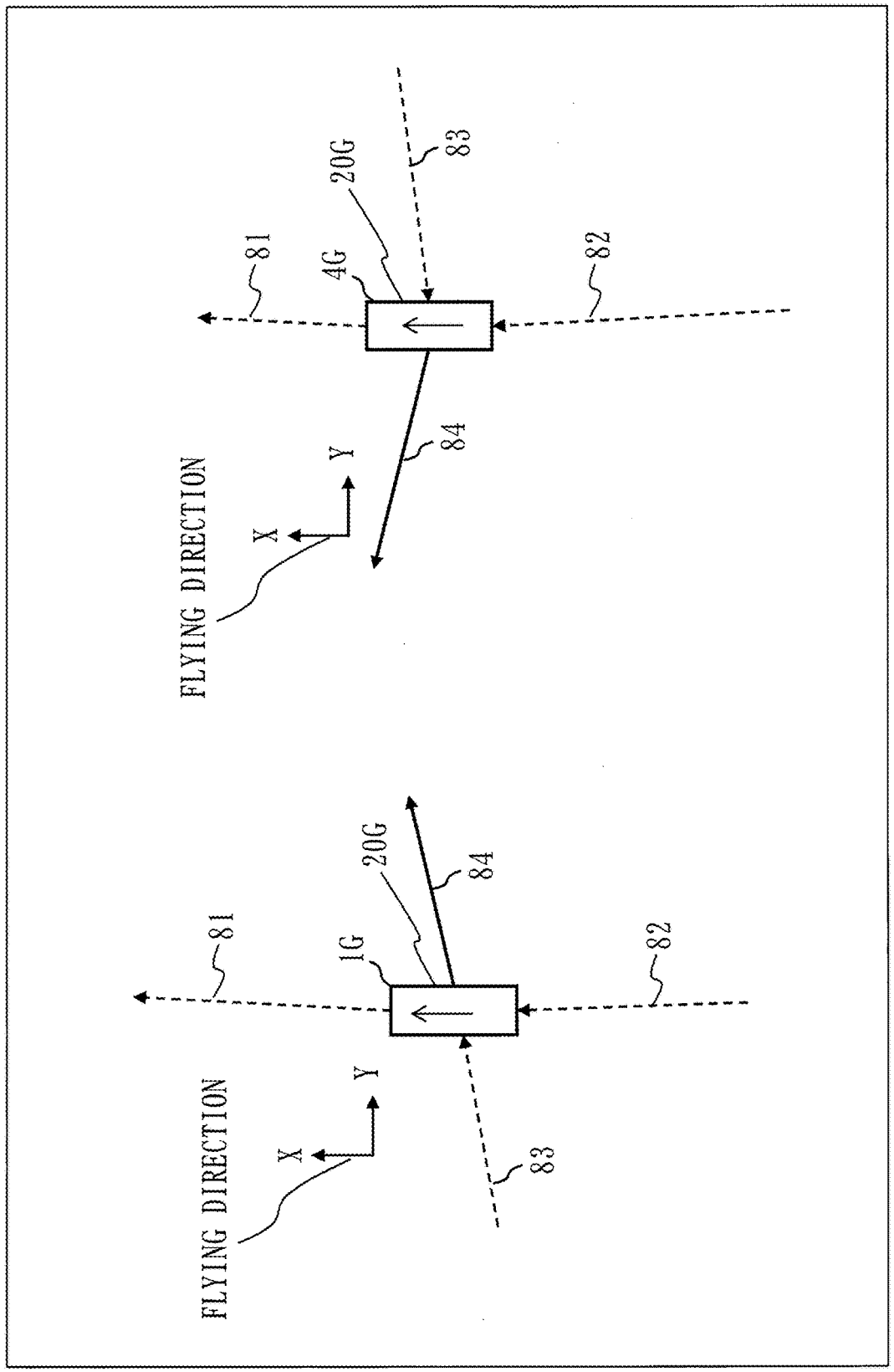
FIG. 9 is a diagram of Embodiment 1, illustrating communication satellites 20G at a position 1G and a position 4G extracted from FIG. 8.

In FIG. 9, the communication satellites 20G at the position 1G and the position 4G are extracted from FIG. 8 and arranged to be illustrated in satellite coordinate system. Since a lateral change occurs between the directions of the optical communication link 83 and the optical communication link 84, they are twisted in the communication satellites 20G. That is, in a communication with an adjacent orbit, if trying to perform communication with the communication satellite 20 flying adjacently to the forwarding direction of the communication satellite 20G, the communication satellite 20G has a difficulty at the position 4G in communication with the communication satellite 20F and the communication satellite 20H flying on adjacent orbits.

Figure 10:
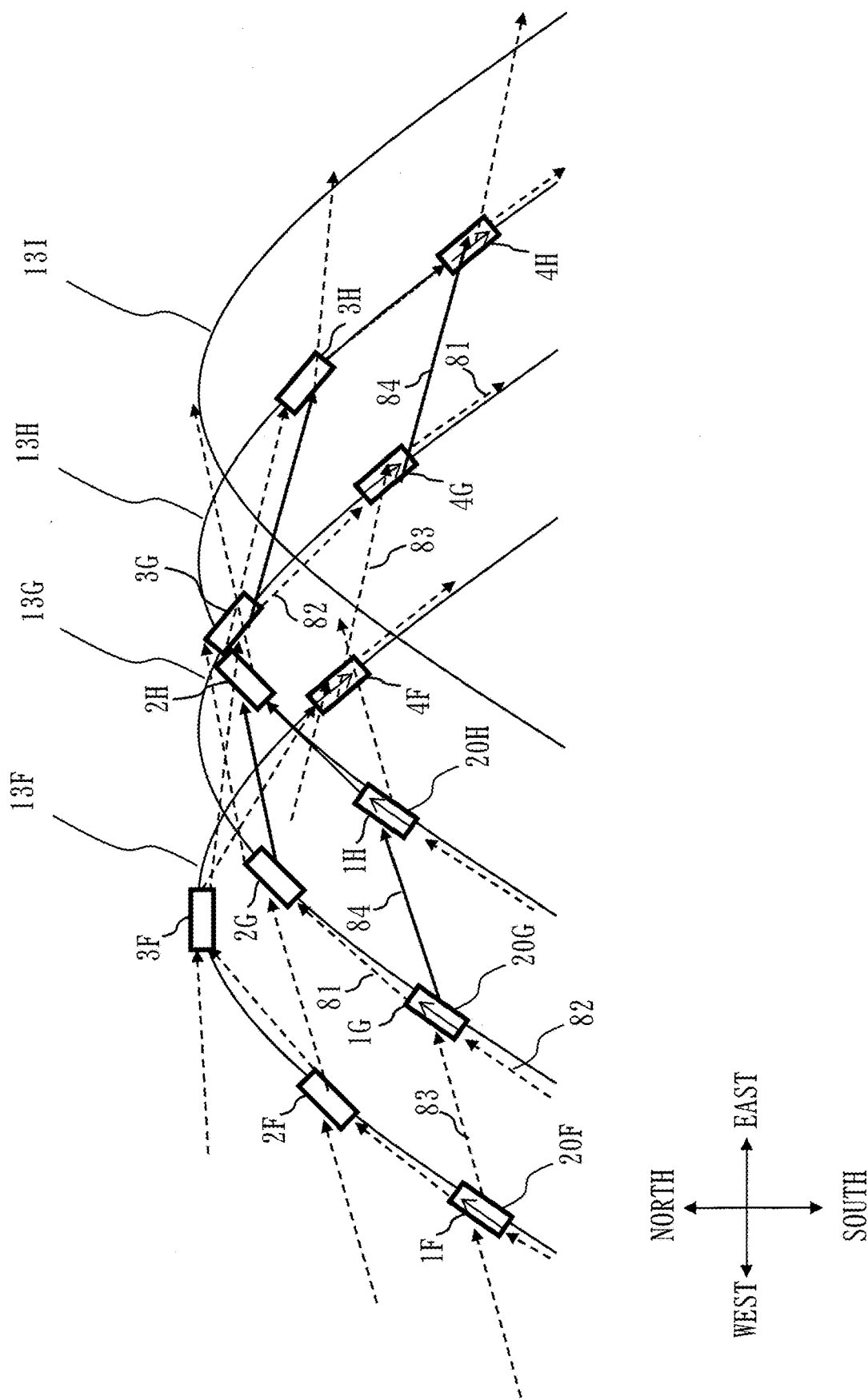
FIG. 10 is a diagram of Embodiment 1, illustrating a scheme of eliminating communication difficulty at the position 4G in FIG. 8.

FIG. 10 is a diagram illustrating a scheme of eliminating communication difficulty at the position 4G in FIG. 8. The scheme in FIG. 10 is different from the scheme in FIG. 8 as follows. In FIG. 8, an optical link is formed with the communication satellite 20 adjacently flying in an adjacent orbit. In FIG. 10, when passing northward over the equator, the communication satellite 20 performs optical communication with another communication satellite 20 flying northeast of an east-side adjacent orbit and performs optical communication with another communication satellite 20 flying southwest of a west-side adjacent orbit. The communication satellite 20G of FIG. 10 is now described.

The communication satellite 20G is connected via the optical communication link 81 to the front communication satellite 20 not depicted in the flying direction and is connected via the optical communication link 82 to the rear communication satellite 20 not depicted in the flying direction. Also, the communication satellite 20G is connected via the optical communication link 83 to the communication satellite 20F at the position 1F flying at a southwest position in the orbit 13F and is connected via the optical communication link 84 to the communication satellite 20H at the position 1H flying at a northeast position in the orbit 13H. In FIG. 10, the optical communication link 84 is indicated by a solid line.

As time elapses, the positions of the communication satellite 20F, the communication satellite 20G, and the communication satellite 20H become the position 4F, the position 4G, and the position 4H, respectively. Here, as for the optical communication link 84 indicated by the solid line, the optical communication link 84 at the position 1G is on the right with respect to the flying direction of the communication satellite 20G. By contrast, at the position 4G after passage over the northern extremity of the orbit, the optical communication link 84 is on the left with respect to the flying direction of the communication satellite 20G. This is the same as FIG. 8.

Figure 11:
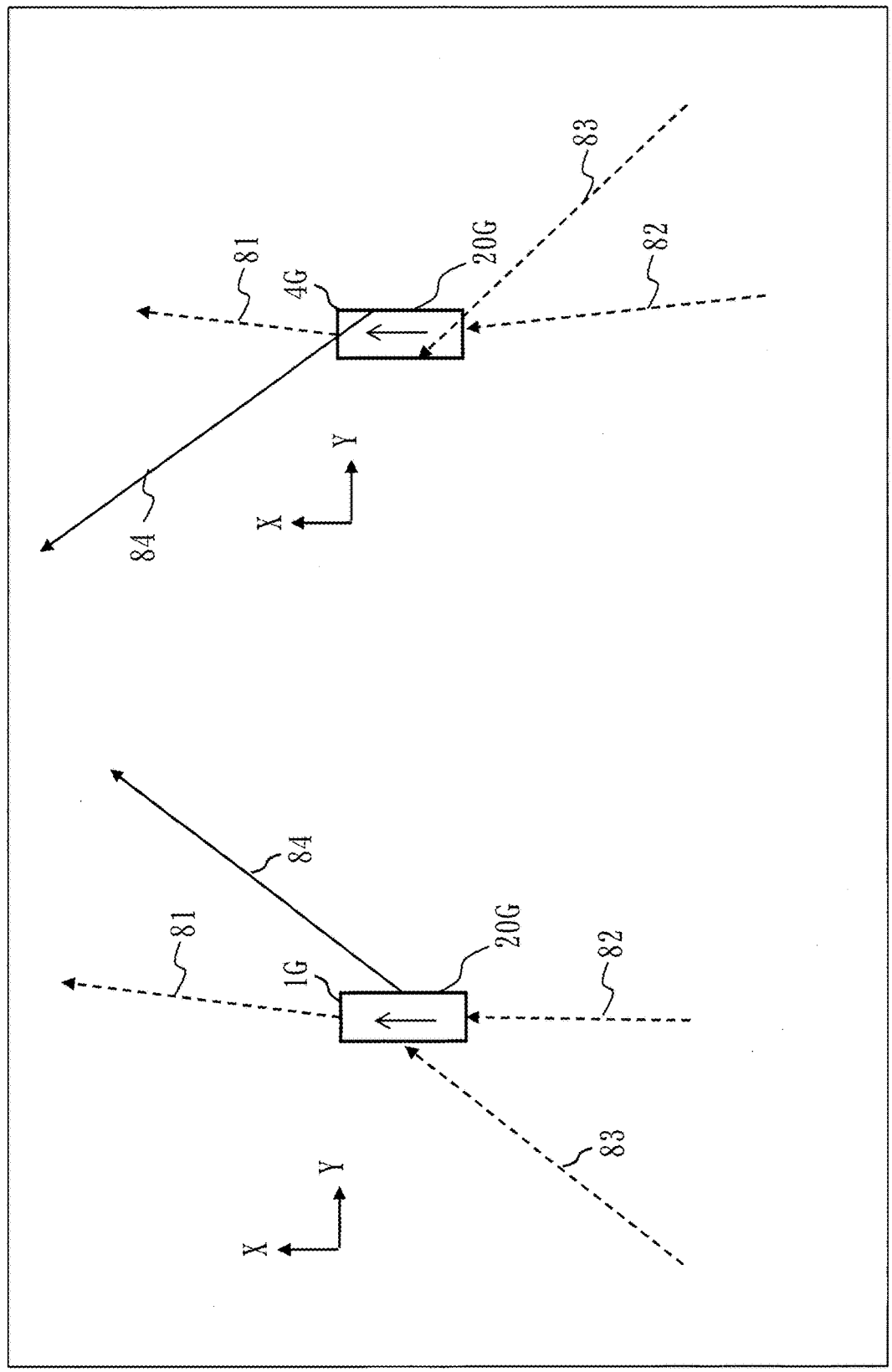
FIG. 11 is a diagram of Embodiment 1, illustrating the communication satellites 20G at the position 1G and the position 4G extracted from FIG. 10.

In FIG. 11, the communication satellites 20G at the position 1G and the position 4G are extracted from FIG. 10 and arranged to be illustrated in satellite coordinate system. Since a lateral change occurs between the directions of the optical communication link 83 and the optical communication link 84, they are twisted in the communication satellites 20G. However, in FIG. 11, the amount of twists of the optical communication link 83 and the optical communication link 84 is small compared with in FIG. 9. In FIG. 11, the amounts of change in direction of the optical communication link 83 and the optical communication link 84 are both within 90 degrees.

Figure 12:
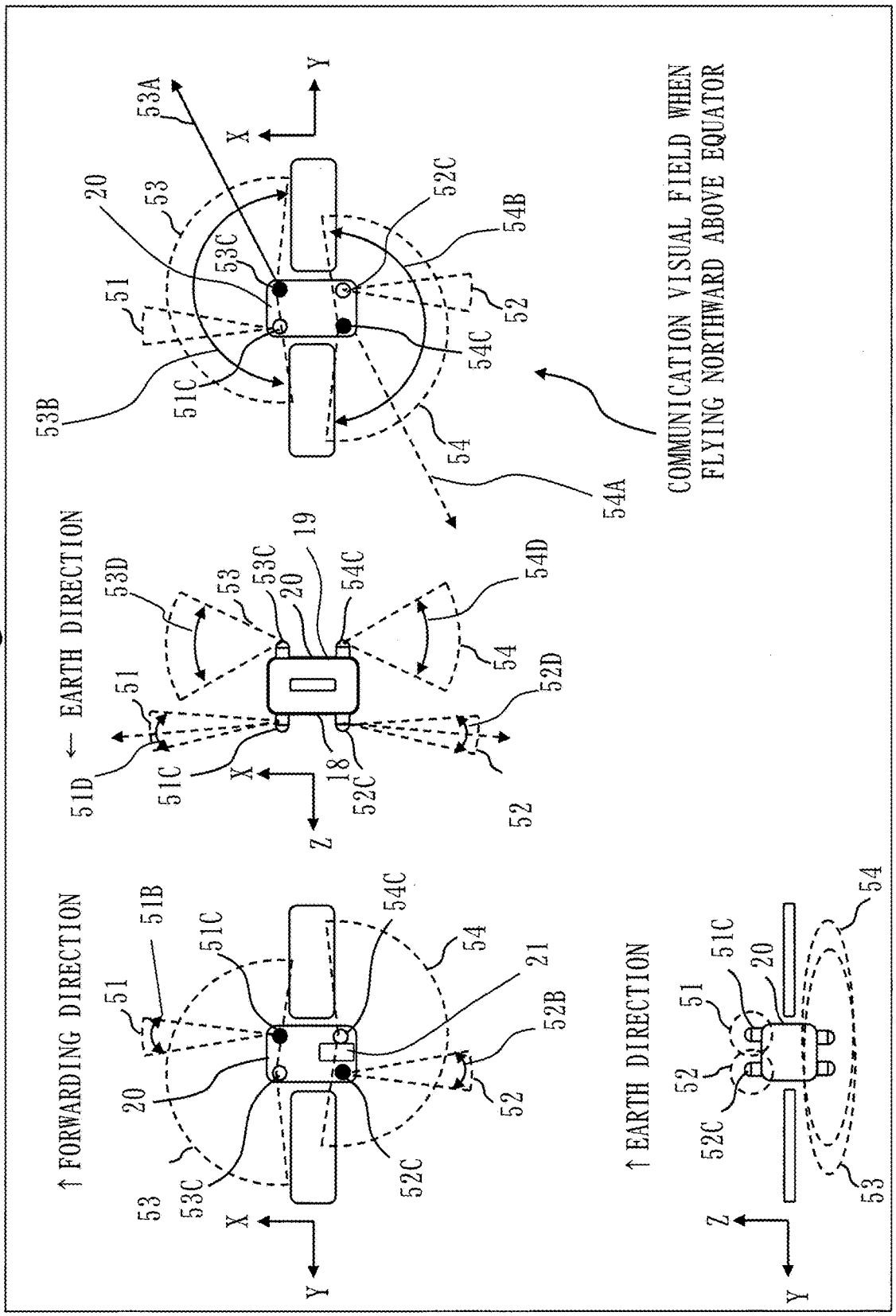
FIG. 12 is a diagram of Embodiment 1, illustrating the arrangement of communication terminals in the communication satellite 20.

FIG. 12 illustrates a specific arrangement of the communication terminals of the communication satellite 20 described in FIG. 10. FIG. 12 illustrates a state in which the communication satellite 20 flies northward above the equator. FIG. 12 illustrates four orthogonal views of the communication satellite 20.

Figure 13:
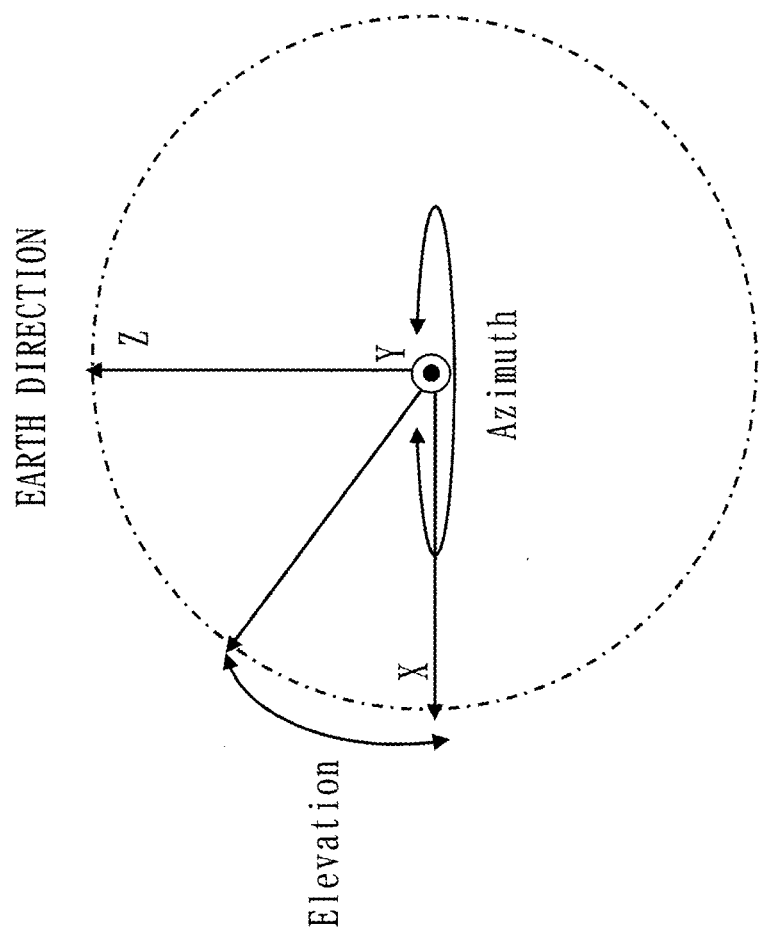
FIG. 13 is a diagram of Embodiment 1, illustrating an Azimuth rotating direction and an Elevation rotating direction.

FIG. 13 illustrates an Azimuth rotating direction and an Elevation rotating direction. The Azimuth rotating direction is about the +Z axis in the right-handed coordinates, and the Elevation rotating direction is about the +Y axis in the right-handed coordinates. The communication satellite 20 is arranged on a plurality of orbital planes in a polar orbit or inclined orbit. The communication satellite 20 includes the first optical communication terminal 51C, the second optical communication terminal 52C, the third optical communication terminal 53C, and the fourth optical communication terminal 54C. The first optical communication terminal 51C performs optical communication with another front communication satellite 20 in the flying direction on the same orbital plane when passing northward above the equator in the case where the +X axis direction oriented to a plus direction in the right-handed coordinates is taken as a satellite forwarding direction +X of the communication satellite 20 and the +Z axis direction oriented to a plus direction in the right-handed coordinates is taken as a geocentric direction +Z of the communication satellite 20. The second optical communication terminal 52C performs optical communication with another rear communication satellite 20 in the flying direction on the same orbital plane when passing northward above the equator. The third optical communication terminal 53C performs optical communication with another communication satellite 20 flying northeast of an east-side adjacent orbit. The fourth optical communication terminal 54C performs optical communication with another communication satellite 20 flying southwest of a west-side adjacent orbit.

In FIG. 12, a black circle on an XY plane indicates that its optical communication terminal can be actually viewed, and a white circle indicates that the optical communication terminal cannot be actually viewed. The first optical communication terminal 51C is arranged forward in the forwarding direction of the communication satellite 20. The first optical communication terminal 51C has a communication visual field 51 in the forwarding direction of the communication satellite 20. The second optical communication terminal 52C is arranged rearward of the first optical communication terminal 51C with respect to the forwarding direction of the communication satellite 20. The second optical communication terminal 52C has a communication visual field 52 in a direction opposite to the forwarding direction of the communication satellite 20. The third optical communication terminal 53C is arranged forward in the forwarding direction of the communication satellite 20. The third optical communication terminal 53C has a communication visual field 53 forward in the forwarding direction of the communication satellite 20. The third optical communication terminal 53C forms an optical communication link with the communication satellite 20 flying in the orbit 13 adjacent on an east side in a northeast communication direction 53A. The fourth optical communication terminal 54C is arranged rearward of the third optical communication terminal 53C with respect to the forwarding direction of the communication satellite 20. The fourth optical communication terminal 54C has a communication visual field 54 in a direction opposite to the forwarding direction of the communication satellite 20. The fourth optical communication terminal 54C forms an optical communication link with the communication satellite 20 flying in the orbit 13 adjacent on a west side in a southwest communication direction 54A.

<Azimuth>

The Azimuth communication visual field of the third optical communication terminal 53C is equal to or more than ±90 degrees with respect to the satellite forwarding direction +X. That is, as illustrated in an XY plane on the right side of FIG. 12, an Azimuth visual field change range 53B of the third optical communication terminal 53C is equal to or more than ±90 degrees with respect to the satellite forwarding direction +X. Also, the Azimuth communication visual field of the fourth optical communication terminal 54C is equal to or more than ±90 degrees with respect to an opposite direction of the satellite forwarding direction +X. That is, an Azimuth visual field change range 54B of the fourth optical communication terminal 54C is equal to or more than ±90 degrees with respect to the opposite direction of the satellite forwarding direction +X.

<Azimuth and Elevation>

The description on FIG. 12 further continues. The first optical communication terminal 51C, the second optical communication terminal 52C, the third optical communication terminal 53C, and the fourth optical communication terminal 54C can make Azimuth rotation about the +Z axis. Since Azimuth visual field changes of the third optical communication terminal 53C and the fourth optical communication terminal 54C have been described, Azimuth visual field changes of the first optical communication terminal 51C and the second optical communication terminal 52C are described. As illustrated in an XY plane on the left side of FIG. 12, the first optical communication terminal 51C can change the communication visual field 51 in an Azimuth visual field change range 51B.

Also, the second optical communication terminal 52C can change the communication visual field 52 in an Azimuth visual field change range 52B.

The first optical communication terminal 51C, the second optical communication terminal 52C, the third optical communication terminal 53C, and the fourth optical communication terminal 54C can make Elevation rotation about the +Y axis oriented to the plus direction in the right-handed orthogonal coordinates. As illustrated in an XZ plane of FIG. 12, the first optical communication terminal 51C can make Elevation rotation about the +Y axis in an Elevation visual field change range 51D. The second optical communication terminal 52C can make Elevation rotation about the +Y axis in an Elevation visual field change range 52D. The third optical communication terminal 53C can make Elevation rotation about the +Y axis in an Elevation visual field change range 53D. The fourth optical communication terminal 54C can make Elevation rotation about the +Y axis in an Elevation visual field change range 54D.

As illustrated in the XZ plane of FIG. 12, the first optical communication terminal 51C and the second optical communication terminal 52C are arranged on an earth-oriented plane 18 facing the earth 600. The third optical communication terminal 53C and the fourth optical communication terminal 54C are arranged on a counter-earth-oriented plane 19, which is a back plane of the earth-oriented plane 18 and is oriented to an opposite direction of the geocentric direction +Z. A driving part for Azimuth and Elevation rotations of the first optical communication terminal 51C and a driving part for Azimuth and Elevation rotations of the third optical communication terminal 53C are not on a forwarding direction vector oriented to the satellite forwarding direction +X. Also, a driving part for Azimuth and Elevation rotations of the second optical communication terminal 52C and a driving part for Azimuth and Elevation rotations of the fourth optical communication terminal 54C are not on the forwarding direction vector.

To ensure a high visual field angle equal to or more than ±90 degrees in optical communication, arrangement of communication devices without interference in visual field in the communication satellite 20 is imperative.

There is an effect in which, by arranging the first optical communication terminal 51C and the second optical communication terminal 52C, and the third optical communication terminal 53C and the fourth optical communication terminal 54C separately, with ones on the earth-oriented plane 18 and the others on the counter-earth-oriented plane 19, a wide communication visual field range can be ensured.

Furthermore, in the first optical communication terminal 51C and the second optical communication terminal 52C, the visual field direction is inclined to the earth direction with respect to the forwarding direction due to a spherical effect of the earth. It is rational to avoid visual field interruption by arrangement on the earth-oriented plane 18. Also, there is an idea in which the first optical communication terminal 51C and the second optical communication terminal 52C are arranged with one on the earth-oriented plane 18 and the other on the counter-earth-oriented plane 19. This poses a problem of a restriction in implementation when the counter-earth-oriented plane 19 serves as a rocket interface at the time of launching a satellite. Furthermore, since a dead zone occurs on the X axis in an optical communication terminal of a biaxial configuration, Elevation on Azimuth, there is a problem in which standardization of communication terminals is difficult. Still further, the first optical communication terminal 51C and the third optical communication terminal 53C have a possibility in which their visual field directions become identical, and the second optical communication terminal 52C and the fourth optical communication terminal 54C have a possibility in which their visual field directions become identical. Therefore, there is a problem of signal interference. However, there is an effect in which such interference can be avoided by arranging the optical communication terminals on the satellite as separated in distance so that the driving part as a driving center of the first optical communication terminal 51C and a driving part as a driving center of the third optical communication terminal 53C are not on the same axis of the forwarding direction vector and the driving part as a driving center of the second optical communication terminal 52C and a driving part as a driving center of the fourth optical communication terminal 54C are not on the same axis of the forwarding direction vector.

According to the communication satellite 20 disclosed in Embodiment 1, there is an effect in which, since standard terminals can be used, cost of system construction can be reduced.

As described above, there is a risk of collision of satellites at an intersection of orbital planes occurring in the mid-latitude zone in inclined orbits, as illustrated in FIG. 5. To avoid the collision risk, collision avoiding measures of changing the orbital altitude for each orbital plane is effective. In this case, there is a problem in which since the ground speed of the communication satellite varies for each orbital plane, this makes it difficult to maintain the communication circuit with the communication satellite in the adjacent orbit as time elapses. In this case, by dynamically changing the orbital altitude, an average orbital altitude is maintained, thereby avoiding a communication circuit breakdown due to a difference in ground speed for each orbital plane. There is an effect in which, by maintaining the average orbital altitude, communication with an adjacent orbit satellite can be always maintained and a collision between satellites can be avoided.

Schemes to dynamically change the orbital altitude are shown below.

<Scheme 1>

In the satellite constellation 11 of the satellite information transmission system 10, the orbital altitude is different for each of orbital planes 12 having different normal vectors and the orbital altitude varies temporally, thus making an even average orbital altitude of the individual orbital planes having different normal vectors.

<Scheme 2>

In the satellite constellation 11, an orbital altitude of each orbital plane 12 of the plurality of orbital planes 12 is different from each other, and each orbital plane of the plurality of orbital planes is equal to each other.

A relative altitude difference between adjacent orbital planes of the plurality of orbital planes assumes a sinusoidal shape when arranged in neighboring order. The orbital altitude of each orbital plane of the plurality of orbital planes varies in the neighboring order with the sinusoidal shape maintained.

<Scheme 3>

In the satellite constellation 11, a plurality of communication satellites 20 fly on each orbital plane 12 as an orbit satellite group. Each communication satellite 20 in the orbit satellite group includes a propulsion device 21 to change the speed. Each communication satellite 20 in the orbit satellite group operates in synchronization with the propulsion devices 21 of the respective communication satellites 20 in the orbit satellite group.

(1) When one orbital plane of a plurality of orbital planes that are adjacent with one another continuously is assumed to be a first orbital plane and the last orbital plane as counted from the first orbital plane is assumed to be the last orbital plane, each communication satellite 20 in the orbit satellite group on the first orbital plane performs a speed increasing/decreasing process which repeats operations of increasing the speed for a first length of time and then decreasing the speed for the first length of time.

(2) Each communication satellite 20 in the orbit satellite group on a second orbital plane, which is the orbital plane adjacent to the first orbital plane, starts the speed increasing/decreasing process after elapse of a second length of time from the point when the speed increasing/decreasing process is started on the first orbital plane.

(3) From the orbital plane adjacent to the second orbital plane toward the last orbital plane, the orbit satellite group on each orbital plane starts the speed increasing/decreasing process after elapse of the second length of time, and the orbit satellite groups on the first to the last orbital planes repeat the speed increasing/decreasing process which is performed after elapse of the second length of time.

<Scheme 4>

As with Scheme 3, in the satellite constellation 11, a plurality of communication satellites 20 fly on each orbital plane 12 as an orbit satellite group. The orbit satellite group on each orbital plane is arranged at an orbital altitude subject to atmospheric drag. Each communication satellite 20 in the orbit satellite group includes the propulsion device 21 to change the speed. Each communication satellite 20 in the orbit satellite group operates in synchronization with the propulsion devices 21 of the respective communication satellites 20 in the orbit satellite group.

(1) When one orbital plane 12 of a plurality of orbital planes 12 that are adjacent with one another continuously is assumed to be a first orbital plane and the last orbital plane as counted from the first orbital plane is assumed to be the last orbital plane, each communication satellite in the orbit satellite group on the first orbital plane performs an atmospheric speed increasing/decreasing process, which repeats the operations of increasing the speed for the first length of time and then stopping the increase and, after the communication satellite has returned to the original altitude due to atmospheric drag, increasing the speed for the first length of time.

(2) Each communication satellite in the orbit satellite group on the second orbital plane, which is the orbital plane adjacent to the first orbital plane, starts the atmospheric speed increasing/decreasing process after elapse of a second length of time from the point when the atmospheric speed increasing/decreasing process is started on the first orbital plane.

(3) From the orbital plane adjacent to the second orbital plane toward the last orbital plane, the orbit satellite group on each orbital plane starts the atmospheric speed increasing/decreasing process after elapse of the second length of time, and the orbit satellite groups on the first to the last orbital planes repeat the atmospheric speed increasing/decreasing process which is performed after elapse of the second length of time.

Schemes 1 to 4 have an effect of being able to avoid a risk of a collision in a mid-latitude zone. When the orbital altitude is different from one orbital plane to another, there is a problem of being unable to maintain a communication circuit between adjacent orbits after elapse of a long time because the ground speed varies for each orbital plane. However, if the altitude varies in a sinusoidal shape as in Scheme 2, an average ground speed will be maintained, which has an effect of being able to avoid a collision while maintaining the communication circuits between adjacent orbits. In Scheme 1, the orbital altitude is different for each of the orbital planes having different normal vectors and the orbital altitude varies temporally, thus making the average orbital altitude equivalent. As a method of implementation for forming a satellite constellation as in Scheme 2, an initial altitude is established in advance such that the orbital altitude assumes a sinusoidal shape when the adjacent orbits are arranged in order, and then the altitude is changed sequentially so that a sinusoidal wave proceeds with temporal variations, thus achieving an even average altitude after one cycle of the sinusoidal wave.

Further schemes to dynamically change the orbital altitude include Schemes 5 and 6 below.

<Scheme 5>

Figure 14:
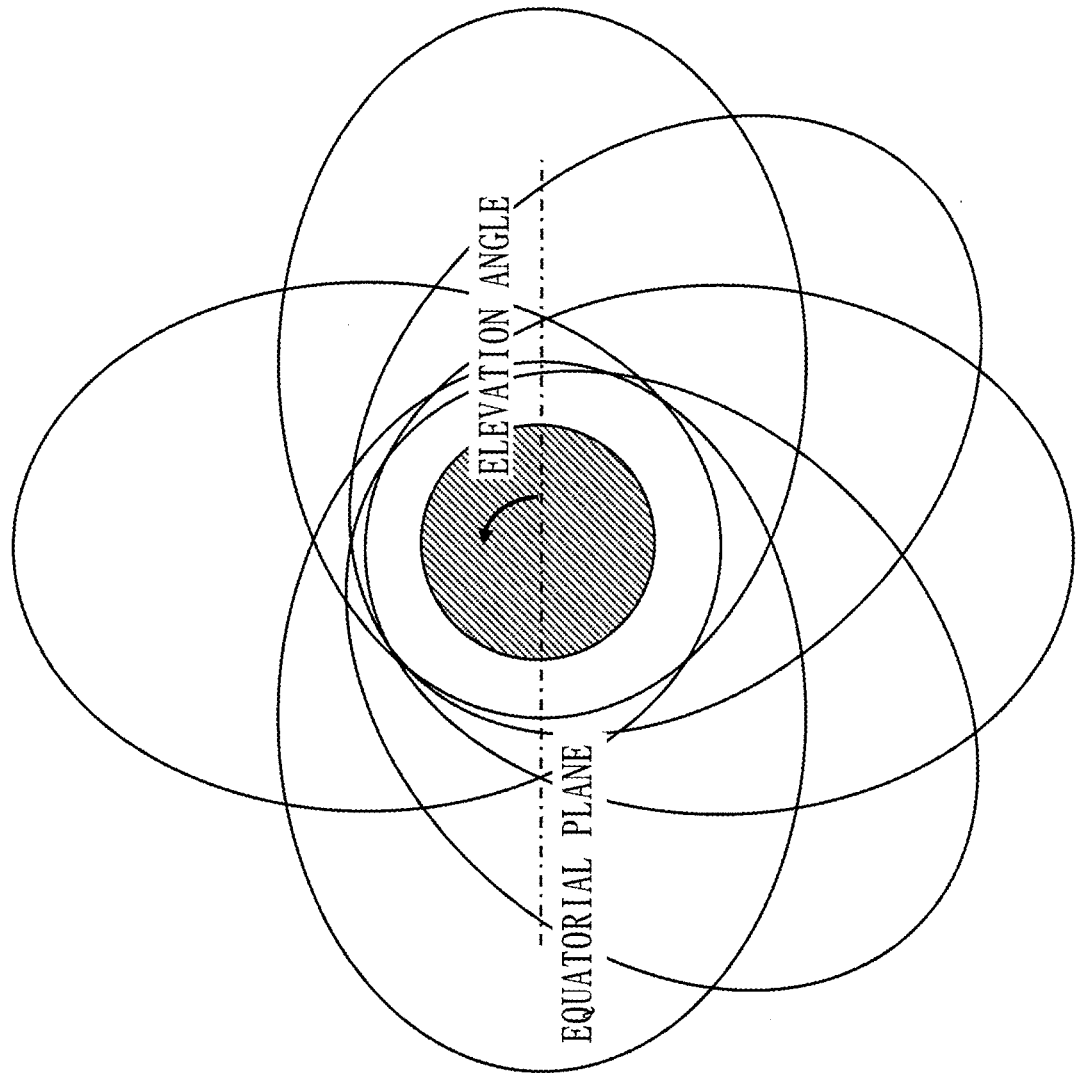
FIG. 14 is a diagram of Embodiment 1, illustrating adjacent major axes arranged in order.

FIG. 14 is a diagram illustrating adjacent major axes arranged in order. In Scheme 5, the plurality of orbital planes 12 of the satellite constellation 11 are elliptical orbits having an eccentricity and the major-axis directions of the elliptical orbits are evenly distributed in Elevation direction for each orbital plane, thus forming the satellite constellation, as illustrated in FIG. 14. Note that FIG. 14 is exaggerated.

<Scheme 6>

The satellite constellation has N (N being a natural number) orbital planes with different normal directions from each other. Each orbital plane of the N orbital planes is an elliptical orbit having the same eccentricity and major axis, where the elevation direction of the major axis of each orbital plane of the N orbital planes has a relative angle of 360/N degrees to each other, and the Azimuth direction of each orbital plane of the N orbital planes has a relative angle of 180/N degrees to each other.

For a satellite constellation formed of a large number of inclined orbital planes, Scheme 5 or 6 has an effect of being able to avoid a collision without causing a communication breakdown because it has no intersection of orbits at any moment and the average orbital altitude during one revolution along the orbit becomes even.

<Communication Satellite 30>

Referring to FIGS. 15 to 19, the communication satellite 30 will be described.

Figure 15:
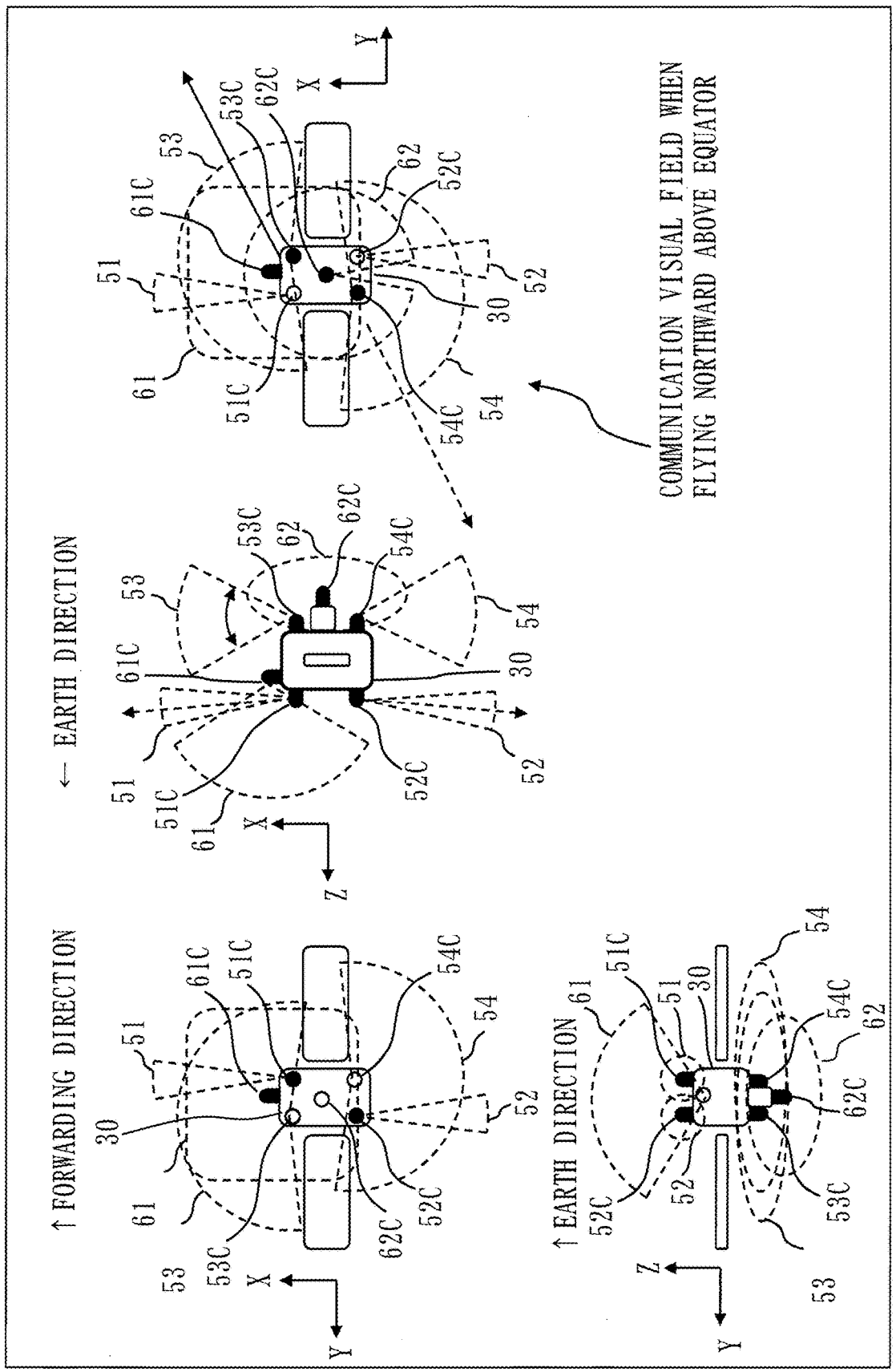
FIG. 15 is a diagram of Embodiment 1, illustrating four orthogonal views of a communication satellite 30.

FIG. 15 illustrates four orthogonal views of the communication satellite 30. FIG. 15 corresponds to FIG. 12.

Figure 16:
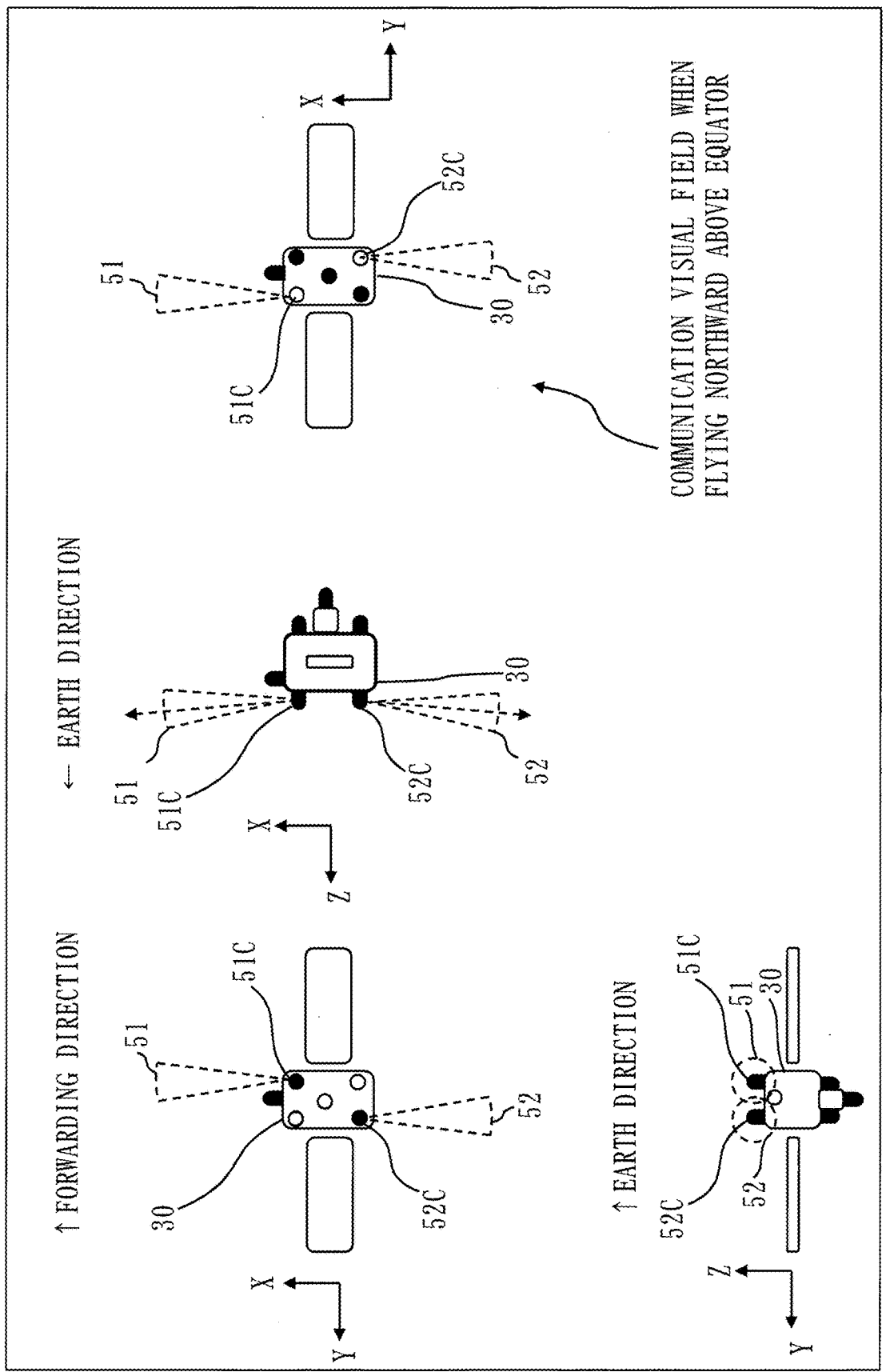
FIG. 16 is a diagram of Embodiment 1, illustrating communication visual fields of a first optical communication terminal 51C and a second optical communication terminal 52C extracted from FIG. 15.

FIG. 16 is a diagram illustrating the communication visual fields of the first optical communication terminal 51C and the second optical communication terminal 52C extracted from FIG. 15.

Figure 17:
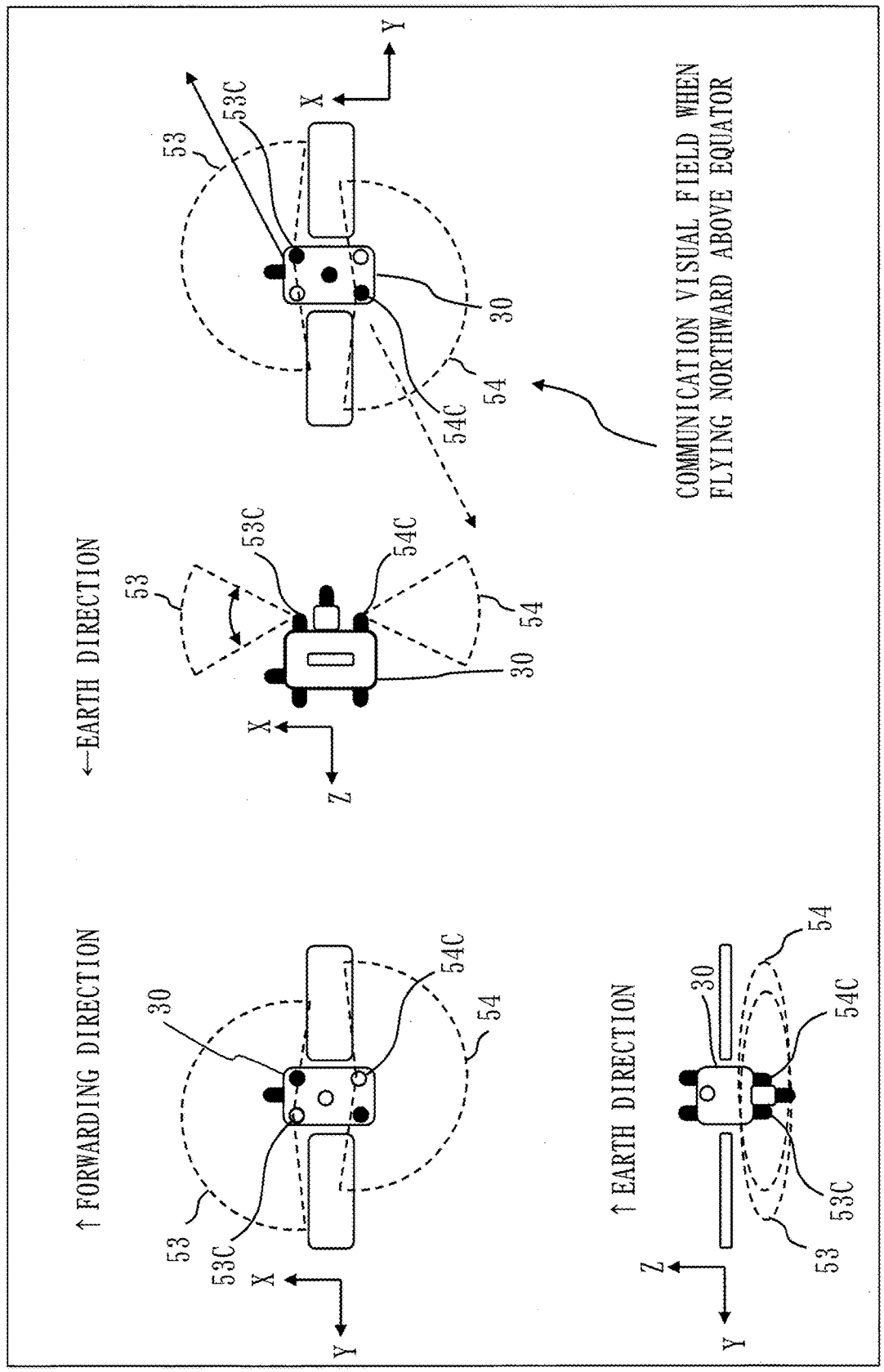
FIG. 17 is a diagram of Embodiment 1, illustrating communication visual fields of a third optical communication terminal 53C and a fourth optical communication terminal 54C extracted from FIG. 15.

FIG. 17 is a diagram illustrating the communication visual fields of the third optical communication terminal 53C and the fourth optical communication terminal 54C extracted from FIG. 15.

Figure 18:
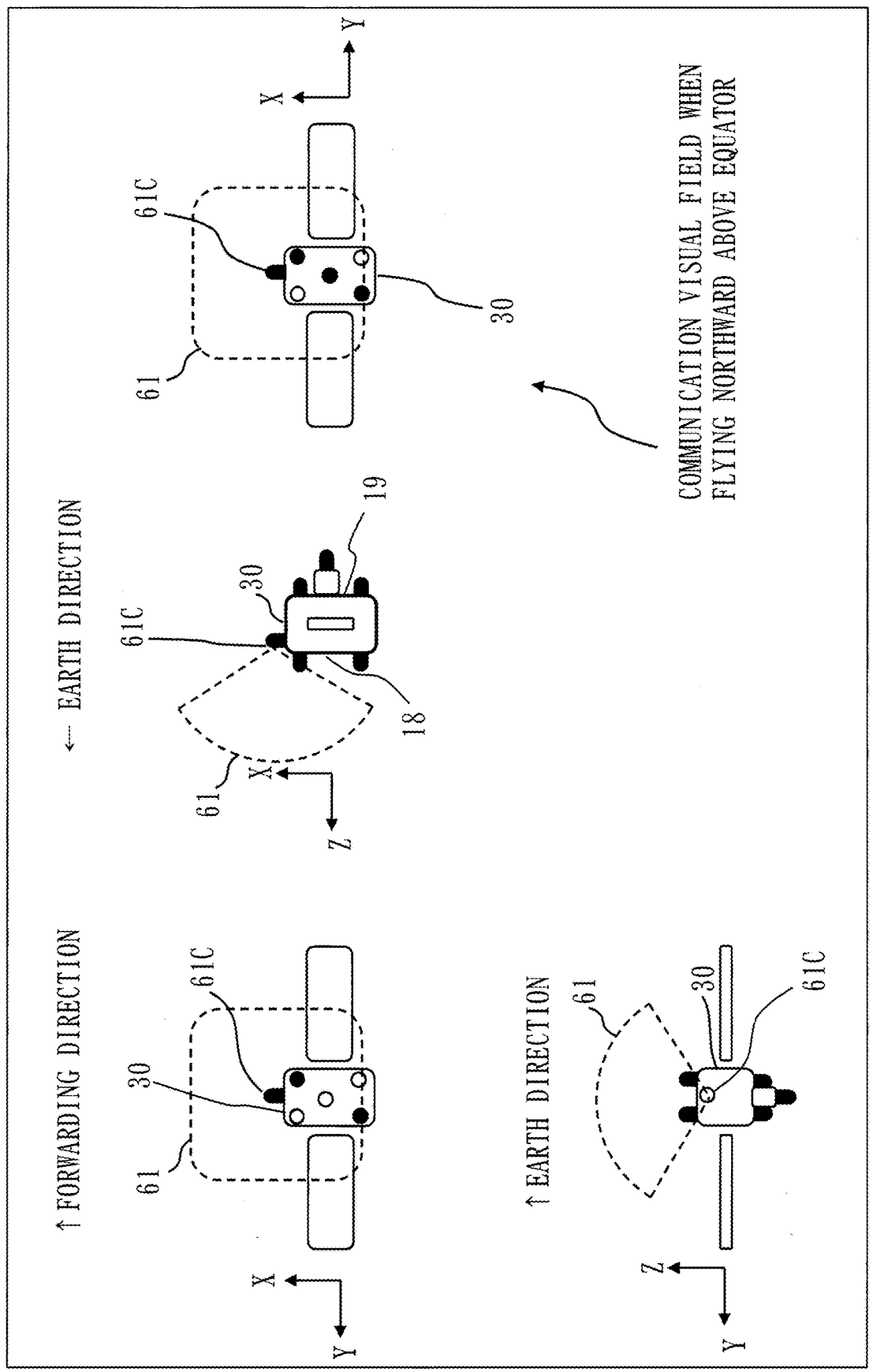
FIG. 18 is a diagram of Embodiment 1, illustrating a communication visual field 61 of a ground communication device 61C extracted from FIG. 15.

FIG. 18 is a diagram illustrating a communication visual field 61 of the ground communication device 61C extracted from FIG. 15.

Figure 19:
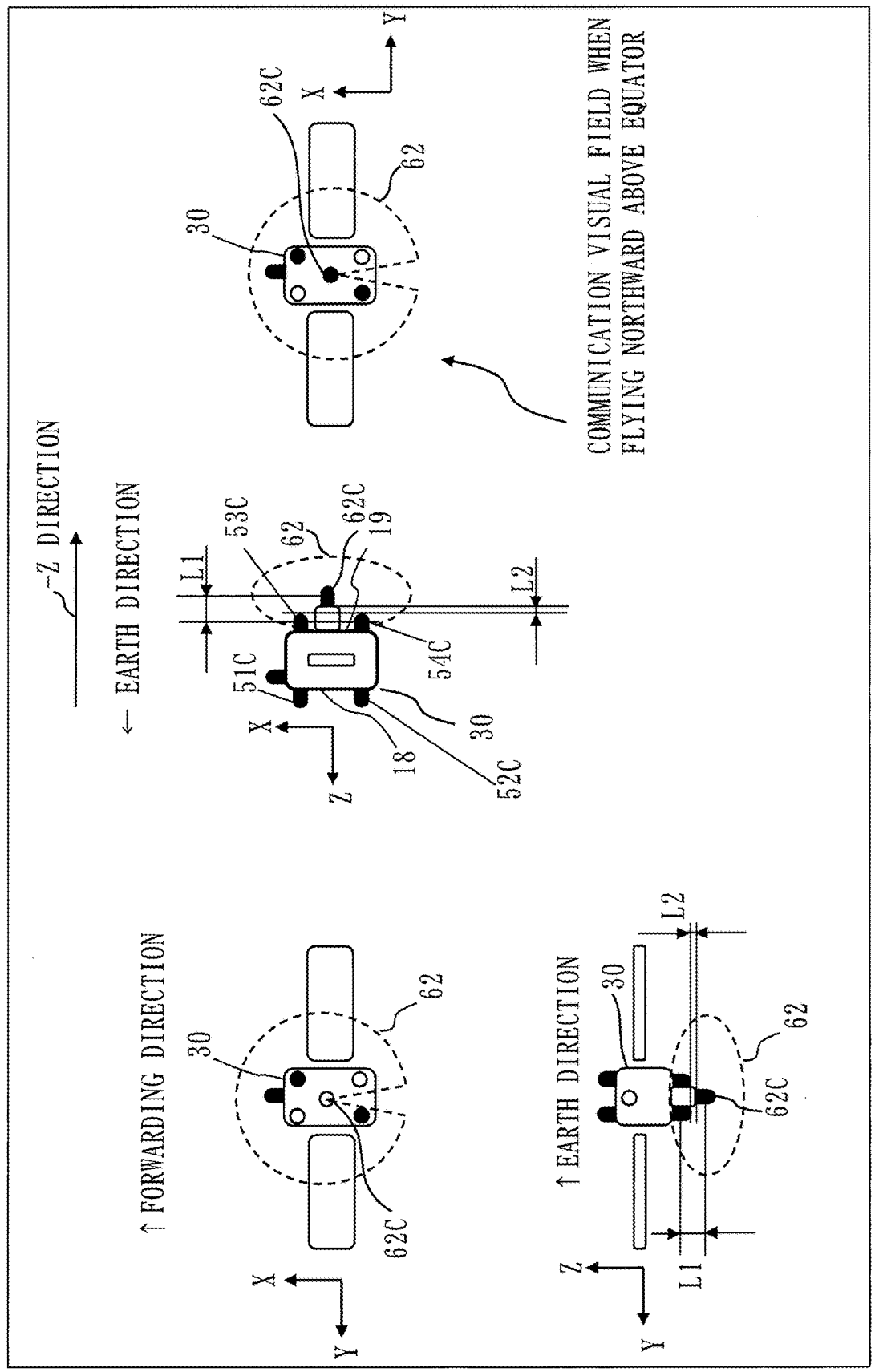
FIG. 19 is a diagram of Embodiment 1, illustrating a communication visual field 62 of a user communication device 62C extracted from FIG. 15.

FIG. 19 is a diagram illustrating a communication visual field 62 of the user communication device 62C extracted from FIG. 15. The communication satellite 30 illustrated in FIG. 15 includes the first optical communication terminal 51C, the second optical communication terminal 52C, the third optical communication terminal 53C, the fourth optical communication terminal 54C, the ground communication device 61C, and the user communication device 62C.

The user communication device 62C protrudes further in −Z direction, which is the counter-earth direction, than the third optical communication terminal 53C and the fourth optical communication terminal 54C, and its driving center at the time of changing the visual field is positioned further in the −Z direction than the driving centers of the third optical communication terminal 53C and the fourth optical communication terminal 54C. Accordingly, the user communication device 62C can change its visual field without interference of the communication visual field with the third optical communication terminal 53C and the fourth optical communication terminal 54C. This will be discussed later.

The function and arrangement positions of the first to the fourth optical communication terminals 51C to 54C provided on the communication satellite 30 are the same as the communication satellite 20 and thus not described.

As illustrated in FIG. 18, the ground communication device 61C is arranged further in the +X direction than the first optical communication terminal 51C and the third optical communication terminal 53C. The communication visual field 61 of the ground communication device 61C is oriented to the geocentric direction.

As illustrated in FIG. 19, the user communication device 62C is arranged further in the −Z direction than the third optical communication terminal 53C and the fourth optical communication terminal 54C on the side of the counter-earth-oriented plane 19. Note that the user communication device 62C may also be an optical communication terminal with a different communication band from any of the first optical communication terminal 51C, the second optical communication terminal 52C, the third optical communication terminal 53C, and the fourth optical communication terminal 54C.

The communication satellite 30 illustrated in FIG. 15 includes the ground communication device 61C and the user communication device 62C. The ground communication device 61C, which communicates with the ground facility 500, can be either a radio wave communication terminal or an optical communication terminal. For optical communication terminals, there is a problem of communication breakdown in cloudy weather. Another problem is that it is technically difficult to achieve directivity precision and directivity stability for maintaining many optical communication circuits simultaneously on a single communication satellite. If optical communication terminals are adopted with these problems solved, mounting a standard optical terminal of Elevation-axis on Azimuth-axis configuration on the satellite forwarding direction plane (+X plane) could ensure the communication visual field, which is rational, including the visual field change range.

The user communication device 62C, which communicates with the user satellite, can also be either a radio wave communication terminal or an optical communication terminal. There is a problem in which it is technically difficult to achieve directivity precision and directivity stability for maintaining many optical communication circuits simultaneously on a single communication satellite by using an optical communication terminal as the user communication device 62C. If an optical communication terminal is adopted with these problems solved, mounting a standard optical terminal of Elevation-axis on Azimuth-axis configuration on the counter-earth-oriented plane 19 could ensure the communication visual field, which is rational, including the visual field change range. In a case where the user communication device 62C is an optical communication terminal, there is an effect of being able to avoid interference by differentiating its frequency band from those of the first to fourth optical communication terminals 51C to 54C. Internationally, there have been practices of inter-satellite optical communications in 1.0 μm band and 1.55 μm band. It is thus rational to adopt the 1.55 μm band for the user communication device 62C if it is an optical communication terminal and the 1.0 μm band for the first to fourth optical communication terminals 51C to 54C or the reverse frequencies. Note that if standard optical communication terminals of two-frequency sharing type become a reality, they will have the effect of reduced cost associated with use of standard terminals.

Figure 20:
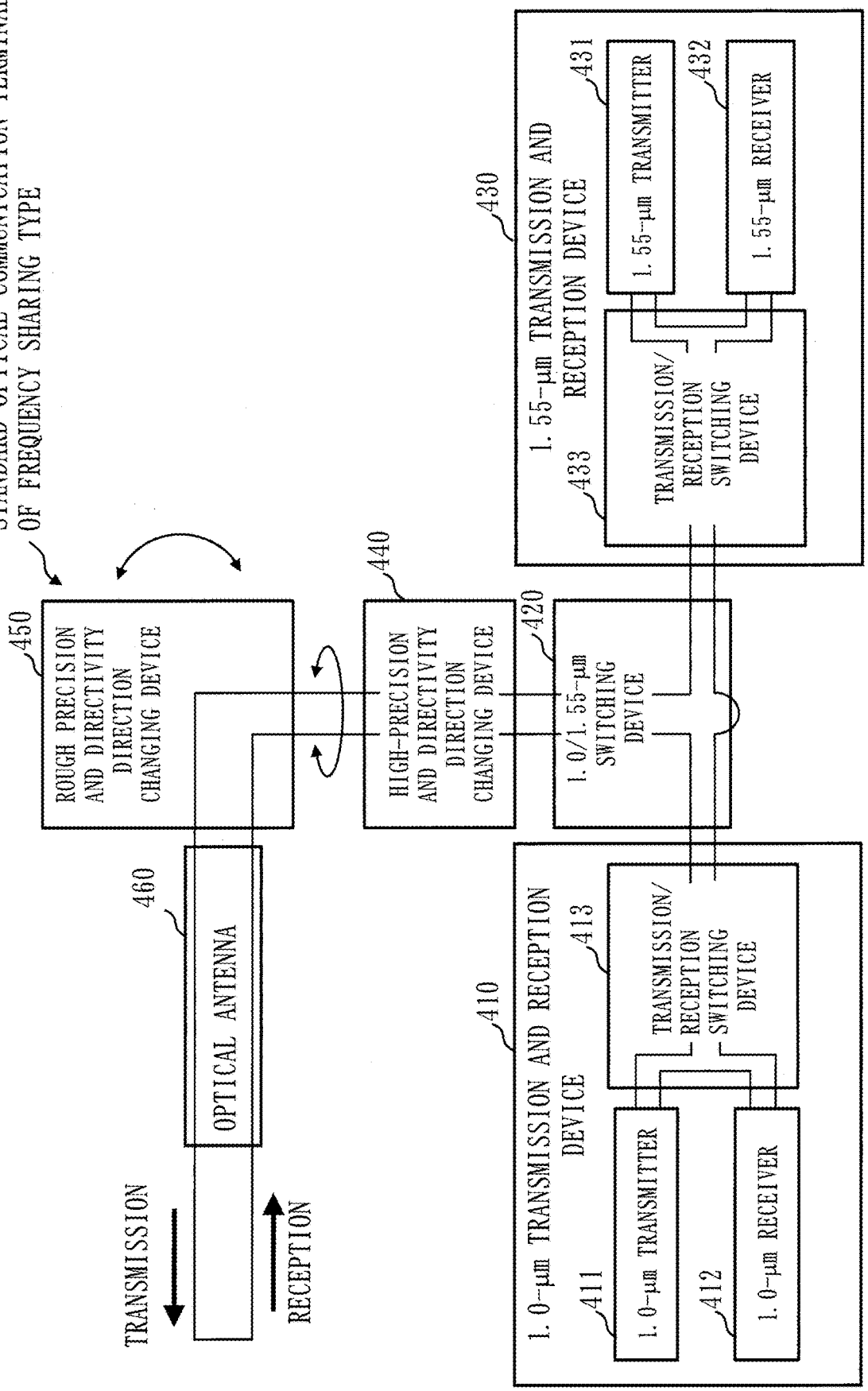
FIG. 20 is a diagram of Embodiment 1, illustrating a standard optical communication terminal of two-frequency sharing type.

FIG. 20 illustrates a standard optical communication terminal of two-frequency sharing type. The standard optical communication terminal of two-frequency sharing type in FIG. 20 includes a 1.0-μm transmission and reception device 410, a 1.0/1.55-μm switching device 420, a 1.55-μm transmission and reception device 430, a high-precision and directivity direction changing device 440, a rough precision and directivity direction changing device 450, and an optical antenna 460. The 1.0-μm transmission and reception device 410 includes a 1.0-μm transmitter 411, a 1.0-μm receiver 412, and a transmission/reception switching device 413. The 1.55-μm transmission and reception device 430 includes a 1.55-μm transmitter 431, a 1.55-μm receiver 432, and a transmission/reception switching device 433.

It goes without saying that the satellite information transmission system 10 described above is also applicable as an information transmission system from a ground facility to a ground facility, including no user satellite. It also goes without saying that the satellite information transmission system 10 is applicable as an information transmission system between earth-side devices, such as aircrafts, UAVs (unmanned aerial vehicles), ships, vehicles, and various ground facilities the same as user satellite. Here, information transmission between earth-side devices means transmitting information from one earth-side device to the other earth-side device via a plurality of communication satellites that form a satellite constellation.

A satellite communication system as an information transmission system is described below.

In this satellite communication system, eight or more communication satellites each having inter-satellite communication devices which perform inter-satellite communication are arranged on the same orbital plane and fly in a plurality of orbital planes which are eight or more arranged adjacent to each other, thus forming a satellite constellation.

One or more communication satellites of the communication satellites arranged on the plurality of orbital planes have an earth communication device which communicates with an earth-side device positioned on the earth.

Each of the communication satellites arranged on the plurality of orbital planes includes:
when the communication satellite passes northward above the equator with a +X axis direction oriented to a plus direction in right-handed coordinates being taken as a satellite forwarding direction +X of the communication satellite and a +Z axis direction oriented to a plus direction in the right-handed coordinates being taken as a geocentric direction +Z of the communication satellite,
a first optical communication terminal to perform optical communication with another front communication satellite in a flying direction on a same orbital plane;
a second optical communication terminal to perform optical communication with another rear communication satellite in the flying direction on the same orbital plane;
a third optical communication terminal to perform optical communication with another communication satellite flying northeast of an east-side adjacent orbit; and
a fourth optical communication terminal to perform optical communication with another communication satellite flying southwest of a west-side adjacent orbit.

An Azimuth communication visual field of the third optical communication terminal is equal to or more than ±90 degrees with respect to the satellite forwarding direction +X, and
an Azimuth communication visual field of the fourth optical communication terminal is equal to or more than ±90 degrees with respect to an opposite direction of the satellite forwarding direction +X.

For a communication circuit with an adjacent orbit in a polar orbit and an inclined orbit, it is difficult to maintain the communication circuit without a breakdown because the orbit of the communication satellite is laterally changed at the northern extremity or the southern extremity of the orbital plane.

To address this, the Azimuth communication visual field of the third optical communication terminal 53C is made equal to or more than ±90 degrees with respect to the satellite forwarding direction +X, and the Azimuth communication visual field of the fourth optical communication terminal 54C is made equal to or more than ±90 degrees with respect to the opposite direction of the satellite forwarding direction +X.

As a result, when the communication satellite passes northward above the equator, the third optical communication terminal 53C performing optical communication with another communication satellite flying northeast of the east-side adjacent orbit changes its forwarding direction to a southward direction after passing the northern extremity of the orbital plane, making a lateral change on the orbital plane.

This causes in the communication of the third optical communication terminal 53C to be laterally changed as well, but the communication satellite still can continue the communication with the communication satellite on the east-side adjacent orbit.

In this manner, when the orbit of the communication satellite changes laterally at the northern extremity or the southern extremity of the orbital plane, the third optical communication terminal 53C performing communications with the fourth optical communication terminal 54C that is on the communication satellite flying on the adjacent orbit can still continue the communication while changing its visual field range, so that their communication circuit can be maintained without a breakdown.

One problem with optical communication terminals is that communication breaks when there is visual field interference in the visual field change range. With the configuration described above, however, the first optical communication terminal 51C and the third optical communication terminal 53C can continue communication with no interference in their visual fields since the first optical communication terminal 51C and the third optical communication terminal 53C are not on the same axis in the satellite forwarding direction +X. The second optical communication terminal 52C and the fourth optical communication terminal 54C are similar to the first optical communication terminal 51C and the third optical communication terminal 53C.

Effects of Embodiment 1

According to the satellite information transmission system 10 of Embodiment 1, a transmission system less prone to communication breakdown can be provided. According to the satellite information transmission system 10, the satellite information transmission system 10 with no risk of collisions of communication satellites can be provided.

Further, according to the satellite communication system of Embodiment 1, a transmission system that is less prone to communication breakdown and has no risk of collisions of communication satellites can be attained for communications between earth-side devices via a satellite constellation.

Figure 21:
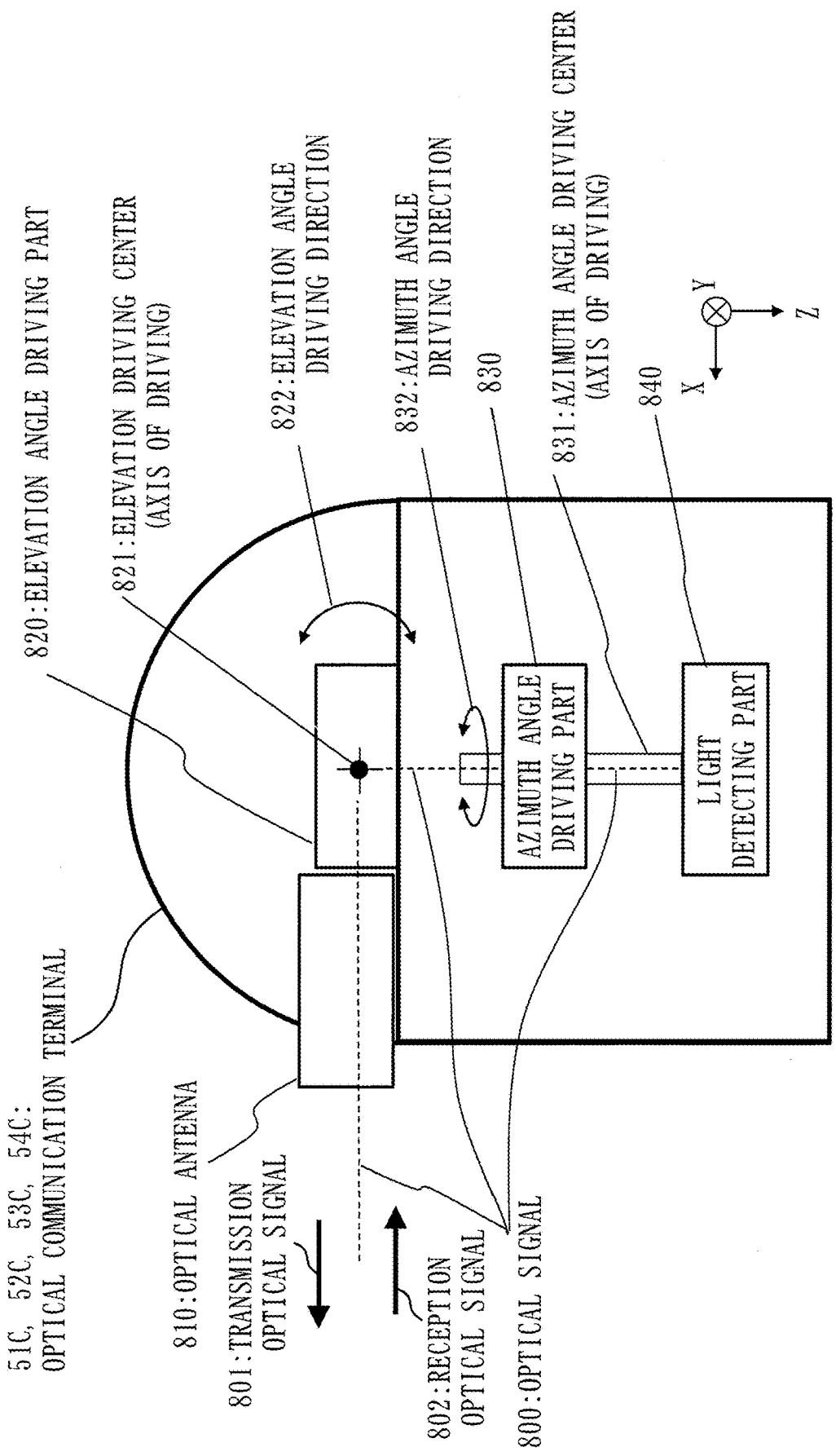
FIG. 21 is a diagram of Embodiment 1, illustrating the structure of the optical communication terminal.
Figure 22:
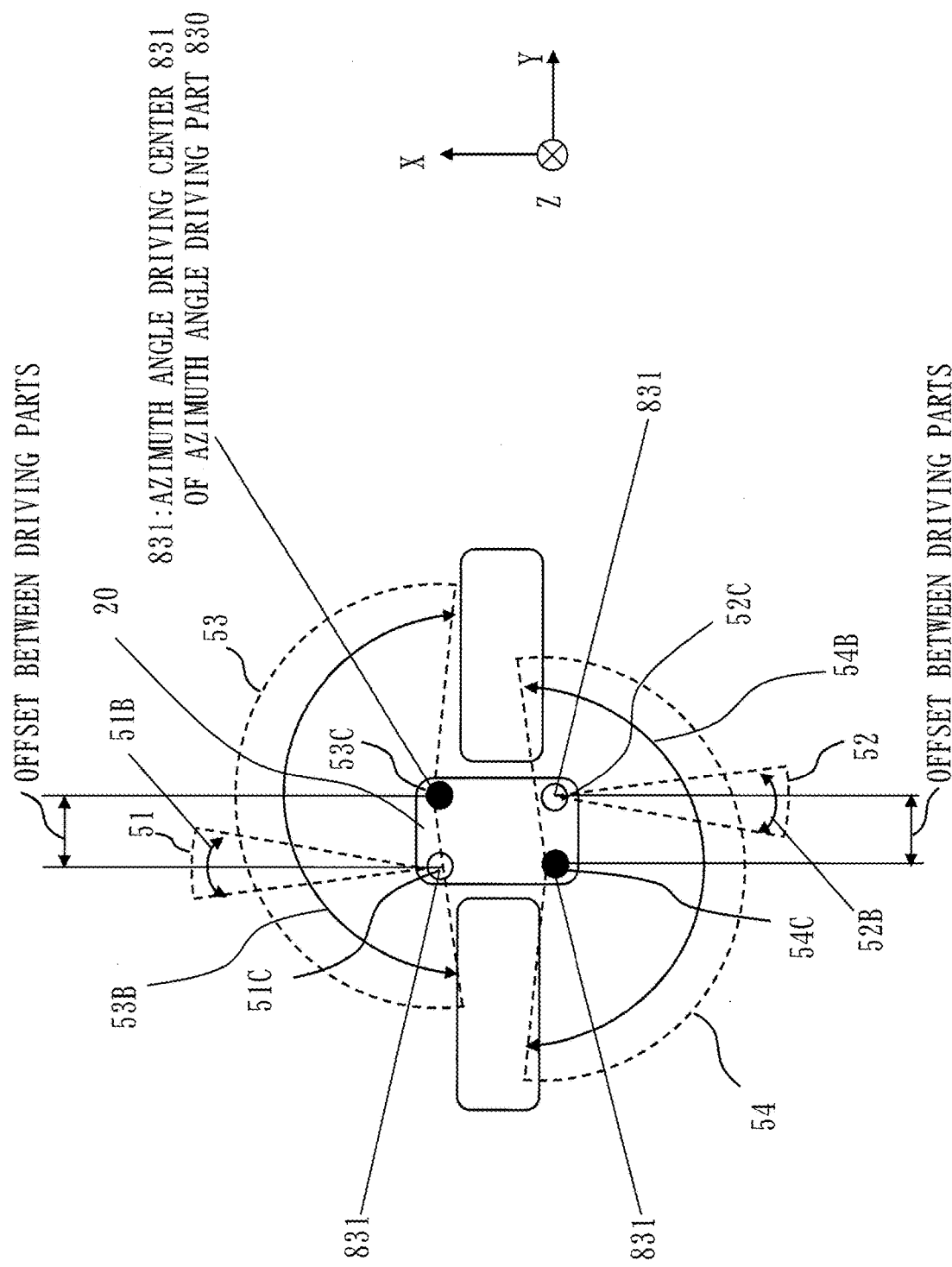
FIG. 22 is a diagram of Embodiment 1, illustrating an offset between Azimuth angle driving parts 830.

Referring to FIGS. 21 to 23, the first optical communication terminal 51C, the second optical communication terminal 52C, the third optical communication terminal 53C, the fourth optical communication terminal 54C, and the user communication device 62C are additionally described. First, the first optical communication terminal 51C, the second optical communication terminal 52C, the third optical communication terminal 53C, and the fourth optical communication terminal 54C as optical communication terminals are additionally described. The first optical communication terminal 51C, the second optical communication terminal 52C, the third optical communication terminal 53C, and the fourth optical communication terminal 54C will be referred to as optical communication terminals when they need not be distinguished from each other.

FIG. 21 is a diagram illustrating the structure of the optical communication terminal. The optical communication terminal includes an optical antenna 810, an Elevation angle driving part 820, an Azimuth angle driving part 830, and a light detecting part 840. A transmission optical signal 801 is transmitted into space from the light detecting part 840 via the Azimuth angle driving part 830, the Elevation angle driving part 820, and the optical antenna 810. A reception optical signal 802 reaches the light detecting part 840 from the optical antenna 810 via the Elevation angle driving part 820 and the Azimuth angle driving part 830. The broken line indicates an optical signal 800. The Elevation angle driving part 820 is driven in an Elevation angle driving direction 822. The Elevation angle driving part 820 rotates about an Elevation angle driving center 821 as the driving center, that is, the center of rotation. Its axis of rotation is in the direction vertically through the page. The Elevation angle driving center 821 is in effect an axis of rotation. The Azimuth angle driving part 830 is driven in an Azimuth angle driving direction 832. The Azimuth angle driving part 830 rotates about an Azimuth angle driving center 831 as the driving center, that is, the center of rotation. Its axis of rotation is contained in the page. The Azimuth angle driving center 831 is in effect an axis of rotation. The coordinates of FIG. 21 are the same as the coordinate system of FIG. 12. The X direction is the forwarding direction of the satellite and the Z direction is the geocentric direction.

FIG. 22 is a diagram illustrating an offset between the Azimuth angle driving parts 830. FIG. 22 is an illustration of the XY coordinates extracted from the right hand portion of FIG. 12, showing an offset between the Azimuth angle driving part 830 of the first optical communication terminal 51C and the Azimuth angle driving part 830 of the third optical communication terminal 53C and an offset between the Azimuth angle driving part 830 of the second optical communication terminal 52C and the Azimuth angle driving part 830 of the fourth optical communication terminal 54C. As described in FIG. 21, the first optical communication terminal 51C, the second optical communication terminal 52C, the third optical communication terminal 53C, and the fourth optical communication terminal 54C each include the Elevation angle driving part 820 and the Azimuth angle driving part 830. By arrangement of the individual optical communication terminals, the Azimuth angle driving parts 830 thereof have offsets between them as illustrated in FIG. 22. Specifically, the Azimuth angle driving part 830 of the first optical communication terminal 51C as the driving center of the first optical communication terminal 51C and the Azimuth angle driving part 830 of the third optical communication terminal 53C as the driving center of the third optical communication terminal 53C are not on the same axis in the satellite forwarding direction +X. Also, the Azimuth angle driving part 830 of the second optical communication terminal 52C as the driving center of the second optical communication terminal 52C and the Azimuth angle driving part 830 of the fourth optical communication terminal 54C as the driving center of the fourth optical communication terminal 54C are not on the same axis in the satellite forwarding direction +X.

FIG. 23 is a diagram illustrating an offset between the Elevation angle driving parts 820. FIG. 23 is an illustration of the XZ coordinates extracted from the upper central portion of FIG. 12, showing an offset between the Elevation angle driving part 820 of the first optical communication terminal 51C and the Elevation angle driving part 820 of the third optical communication terminal 53C and an offset between the Elevation angle driving part 820 of the second optical communication terminal 52C and the Elevation angle driving part 820 of the fourth optical communication terminal 54C. By arrangement of the individual optical communication terminals, the Elevation angle driving parts 820 thereof have offsets between them as illustrated in FIG. 23. Specifically, the Elevation angle driving part 820 of the first optical communication terminal 51C as the driving center of the first optical communication terminal 51C and the Elevation angle driving part 820 of the third optical communication terminal 53C as the driving center of the third optical communication terminal 53C are not on the same axis in the satellite forwarding direction +X. Also, the Elevation angle driving part 820 of the second optical communication terminal 52C as the driving center of the second optical communication terminal 52C and the Elevation angle driving part 820 of the fourth optical communication terminal 54C as the driving center of the fourth optical communication terminal 54C are not on the same axis in the satellite forwarding direction +X.

Thus, as illustrated in FIGS. 22 and 23, the driving part of the first optical communication terminal 51C and the driving part of the third optical communication terminal 53C are not on the same axis in the satellite forwarding direction +X, and the driving part of the second optical communication terminal 52C and the driving part of the fourth optical communication terminal 54C are not on the same axis in the satellite forwarding direction +X. As a result, there is an effect of being able to avoid interference between the communication visual fields of optical terminals in communication. By avoiding interference of the communication visual fields, communication satellites can fly without communication breakdown, including the southern and northern edges of orbital planes. It thus is obvious that, if there is no communication breakdown at southern and northern edges, the communication satellites can fly for a number of revolutions without communication breakdown and the communication satellites can provide services continuously without communication breakdown permanently. The structures of FIGS. 22 and 23 are applicable to all sorts of satellites that have the first optical communication terminal 51C, the second optical communication terminal 52C, the third optical communication terminal 53C, and the fourth optical communication terminal 54C.

Referring to the diagram of the XZ plane and YZ plane of FIG. 19, the user communication device 62C is additionally described. As illustrated in the diagram of the XZ plane and YZ plane of FIG. 19, the first optical communication terminal 51C and the second optical communication terminal 52C are arranged on the earth-oriented plane 18 facing the earth. The third optical communication terminal 53C, the fourth optical communication terminal 54C, and the user communication device 62C are arranged on the counter-earth-oriented plane 19, which is a back plane of the earth-oriented plane 18 and is a plane oriented to the opposite direction of the geocentric direction +Z. The user communication device 62C is arranged at a position further in the −Z direction, which is the opposite direction of the geocentric direction +Z, than the third optical communication terminal 53C and the fourth optical communication terminal 54C. In FIG. 19, dimension L1 indicates a distance L1 between the driving parts of the third optical communication terminal 53C and the fourth optical communication terminal 54C and the driving part of the user communication device 62C. A driving part is a communication visual field changing mechanism for changing the communication visual field. For optical communication terminals, it is the Elevation angle driving part 820 and the Azimuth angle driving part 830. Dimension L2 indicates the distance between the edges of the third optical communication terminal 53C and the fourth optical communication terminal 54C in the −Z direction and the user communication device 62C in the +Z direction.

As indicated by dimension L1 and dimension L2, the user communication device 62C protrudes further in the −Z direction, which is the counter-earth direction, than the third optical communication terminal 53C and the fourth optical communication terminal 54C.

Further, the driving center of the user communication device 62C during a visual field change is positioned further in the −Z direction than the driving centers of the third optical communication terminal 53C and the fourth optical communication terminal 54C. Thus, the user communication device 62C is able to change its visual field without interference of the communication visual field with the third optical communication terminal 53C and the fourth optical communication terminal 54C.

REFERENCE SIGNS LIST

10: satellite information transmission system; 11: satellite constellation; 12: orbital plane; 13: orbit; 18: earth-oriented plane; 19: counter-earth-oriented plane; 20, 20A, 20B, 20C, 20D, 20E, 20F, 20G, 20H: communication satellite; 21: propulsion device; 30: communication satellite; 40: user satellite; 51: communication visual field; 51B: Azimuth visual field change range; 51C: first optical communication terminal; 51D: Elevation visual field change range; 52: communication visual field; 52B: Azimuth visual field change range; 52C: second optical communication terminal; 52D: Elevation visual field change range; 53: communication visual field; 53A: northeast communication direction; 53B: Azimuth visual field change range; 53C: third optical communication terminal; 53D: Elevation visual field change range; 54A: southwest communication direction; 54B: Azimuth visual field change range; 54C: fourth optical communication terminal; 54D: Elevation visual field change range; 61C: ground communication device; 62C: user communication device; 71: optical communication link; 81, 82, 83, 84: optical communication link; 410: 1.0-μm transmission and reception device; 420: 1.0/1.55-μm switching device; 430: 1.55-μm transmission and reception device; 440: high-precision and directivity direction changing device; 450: rough precision and directivity direction changing device; 460: optical antenna; 500: ground facility; 600: the earth; 800: optical signal; 801: transmission optical signal; 802: reception optical signal; 810: optical antenna; 820: Elevation angle driving part; 821: Elevation angle driving center; 822: Elevation angle driving direction; 830: Azimuth angle driving part; 831: Azimuth angle driving center; 832: Azimuth angle driving direction; 840: light detecting part

The invention claimed is:

1. A satellite information transmission system to relay and transmit satellite information between a user satellite and a ground facility on the earth, wherein
   eight or more communication satellites each having inter-satellite communication devices which perform inter-satellite communication are arranged on a same orbital plane and fly in a plurality of orbital planes which are eight or more arranged adjacent to each other, thus forming a satellite constellation,
   one or more communication satellites of the communication satellites arranged on the plurality of orbital planes have a user communication device which communicates with the user satellite,
   each of the communication satellites arranged on the plurality of orbital planes includes,
      when the communication satellite passes northward above the equator with a +X axis direction oriented to a plus direction in right-handed coordinates being taken as a satellite forwarding direction +X of the communication satellite and a +Z axis direction oriented to a plus direction in the right-handed coordinates being taken as a geocentric direction +Z of the communication satellite,
      a first optical communication terminal as one of the inter-satellite communication devices to perform optical communication with another front communication satellite in a flying direction on the same orbital plane,
      a second optical communication terminal as one of the inter-satellite communication devices to perform optical communication with another rear communication satellite in the flying direction on the same orbital plane,
      a third optical communication terminal as one of the inter-satellite communication devices to perform optical communication with another communication satellite flying northeast of an east-side adjacent orbit, and
      a fourth optical communication terminal as one of the inter-satellite communication devices to perform optical communication with another communication satellite flying southwest of a west-side adjacent orbit,
   an Azimuth communication visual field of the third optical communication terminal is equal to or more than ±90 degrees with respect to the satellite forwarding direction +X,
   an Azimuth communication visual field of the fourth optical communication terminal is equal to or more than ±90 degrees with respect to an opposite direction of the satellite forwarding direction +X,
   a driving part as a driving center of the first optical communication terminal and a driving part as a driving center of the third optical communication terminal are not on a same axis in the satellite forwarding direction +X, and
   a driving part as a driving center of the second optical communication terminal and a driving part as a driving center of the fourth optical communication terminal are not on the same axis in the satellite forwarding direction +X.

2. The satellite information transmission system according to claim 1, wherein
   the first optical communication terminal, the second optical communication terminal, the third optical communication terminal, and the fourth optical communication terminal are capable of making Azimuth rotation about a +Z axis and capable of making Elevation rotation about a +Y axis oriented to a plus direction in the right-handed orthogonal coordinates,
   the first optical communication terminal and the second optical communication terminal are arranged on an earth-oriented plane facing the earth, and
   the third optical communication terminal and the fourth optical communication terminal are arranged on a counter-earth-oriented plane, the counter-earth-oriented plane being a back plane of the earth-oriented plane and being oriented to an opposite direction of the geocentric direction +Z.

3. The satellite information transmission system according to claim 1, wherein
   in the satellite constellation, an orbital altitude is different for each of orbital planes having different normal vectors and the orbital altitude varies temporally, thus making an even average orbital altitude of the individual orbital planes having different normal vectors.

4. The satellite information transmission system according to claim 1, wherein
in the satellite constellation, an orbital altitude of each orbital plane of the plurality of orbital planes is different from each other, and each orbital plane of the plurality of orbital planes has an orbital inclination such that an orbital period of each orbital plane of the plurality of orbital planes is equal to each other,
a relative altitude difference between adjacent orbital planes of the plurality of orbital planes assumes a sinusoidal shape when arranged in neighboring order, and
the orbital altitude of each orbital plane of the plurality of orbital planes varies in the neighboring order with the sinusoidal shape maintained.

5. The satellite information transmission system according to claim 1, wherein in the satellite constellation, a plurality of the communication satellites fly on each orbital plane as an orbit satellite group,
each of the communication satellites in the orbit satellite group includes a propulsion device to change a speed, and operates in synchronization with the propulsion devices of the respective communication satellites in the orbit satellite group,
when one orbital plane of a plurality of orbital planes that are adjacent with one another continuously is assumed to be a first orbital plane and a last orbital plane as counted from the first orbital plane is assumed to be the last orbital plane,
each communication satellite in the orbit satellite group on the first orbital plane performs a speed increasing and decreasing process which repeats operations of increasing the speed for a first length of time and then decreasing the speed for the first length of time,
each communication satellite in the orbit satellite group on a second orbital plane, which is the orbital plane adjacent to the first orbital plane, starts the speed increasing and decreasing process after elapse of a second length of time from a point when the speed increasing and decreasing process is started on the first orbital plane, and
from the orbital plane adjacent to the second orbital plane toward the last orbital plane, the orbit satellite group on each orbital plane starts the speed increasing and decreasing process after elapse of the second length of time, and the orbit satellite groups on the first orbital plane to the last orbital plane repeat the speed increasing and decreasing process which is performed after elapse of the second length of time.

6. The satellite information transmission system according to claim 1, wherein
in the satellite constellation, a plurality of the communication satellites fly on each orbital plane as an orbit satellite group, and the orbit satellite group on each orbital plane is arranged at an orbital altitude subject to atmospheric drag,
each of the communication satellites in the orbit satellite group includes a propulsion device to change a speed, and operates in synchronization with the propulsion devices of the respective communication satellites in the orbit satellite group,
when one orbital plane of a plurality of orbital planes that are adjacent with one another continuously is assumed to be a first orbital plane and a last orbital plane as counted from the first orbital plane is assumed to be the last orbital plane,
each communication satellite in the orbit satellite group on the first orbital plane performs an atmospheric speed increasing and decreasing process, which repeats operations of increasing the speed for a first length of time and then stopping the increase and, after the communication satellite has returned to its original altitude due to the atmospheric drag, increasing the speed for the first length of time,
each communication satellite in the orbit satellite group on a second orbital plane, which is the orbital plane adjacent to the first orbital plane, starts the atmospheric speed increasing and decreasing process after elapse of a second length of time from a point when the atmospheric speed increasing and decreasing process is started on the first orbital plane,
from the orbital plane adjacent to the second orbital plane toward the last orbital plane, the orbit satellite group on each orbital plane starts the atmospheric speed increasing and decreasing process after elapse of the second length of time, and
the orbit satellite groups on the first orbital plane to the last orbital plane repeat the atmospheric speed increasing and decreasing process which is performed after elapse of the second length of time.

7. The satellite information transmission system according to claim 1, wherein
the plurality of orbital planes of the satellite constellation are elliptical orbits having an eccentricity, and major-axis directions of the elliptical orbits are evenly distributed in an Elevation direction for each of the orbital planes to form the satellite constellation.

8. The satellite information transmission system according to claim 1, wherein
the satellite constellation has N (N being a natural number) orbital planes with different normal directions from each other, and
each orbital plane of the N orbital planes is an elliptical orbit having same eccentricity and major axis, where an elevation direction of the major axis of each orbital plane of the N orbital planes has a relative angle of 360/N degrees to each other, and an Azimuth direction of each orbital plane of the N orbital planes has a relative angle of 180/N degrees to each other.

9. The satellite information transmission system according to claim 1, wherein
the user communication device is an optical communication terminal with a different communication band from any of the first optical communication terminal, the second optical communication terminal, the third optical communication terminal, and the fourth optical communication terminal.

10. A communication satellite for use in the satellite information transmission system according to claim 1.

11. A ground facility for use in the satellite information transmission system according to claim 1.

12. A satellite communication system, wherein
eight or more communication satellites each having inter-satellite communication devices which perform inter-satellite communication are arranged on a same orbital plane and fly in a plurality of orbital planes which are eight or more arranged adjacent to each other, thus forming a satellite constellation,
one or more communication satellites of the communication satellites arranged on the plurality of orbital planes have an earth communication device which communicates with an earth-side device positioned on the earth,
each of the communication satellites arranged on the plurality of orbital planes includes,
when the communication satellite passes northward above the equator with a +X axis direction oriented to a plus direction in right-handed coordinates being taken as a satellite forwarding direction +X of the communication satellite and a +Z axis direction oriented to a plus direction in the right-handed coordinates being taken as a geocentric direction +Z of the communication satellite,
a first optical communication terminal as one of the inter-satellite communication devices to perform optical communication with another front communication satellite in a flying direction on the same orbital plane,
a second optical communication terminal as one of the inter-satellite communication devices to perform optical communication with another rear communication satellite in the flying direction on the same orbital plane,
a third optical communication terminal as one of the inter-satellite communication devices to perform optical communication with another communication satellite flying northeast of an east-side adjacent orbit, and
a fourth optical communication terminal as one of the inter-satellite communication devices to perform optical communication with another communication satellite flying southwest of a west-side adjacent orbit,
an Azimuth communication visual field of the third optical communication terminal is equal to or more than ±90 degrees with respect to the satellite forwarding direction +X,
an Azimuth communication visual field of the fourth optical communication terminal is equal to or more than ±90 degrees with respect to an opposite direction of the satellite forwarding direction +X,
a driving part as a driving center of the first optical communication terminal and a driving part as a driving center of the third optical communication terminal are not on a same axis in the satellite forwarding direction +X, and
a driving part as a driving center of the second optical communication terminal and a driving part as a driving center of the fourth optical communication terminal are not on the same axis in the satellite forwarding direction +X.

13. A satellite information transmission system to relay and transmit satellite information between a user satellite and a ground facility on the earth, wherein
eight or more communication satellites each having inter-satellite communication devices which perform inter-satellite communication are arranged on a same orbital plane and fly in a plurality of orbital planes which are eight or more arranged adjacent to each other, thus forming a satellite constellation,
one or more communication satellites of the communication satellites arranged on the plurality of orbital planes have a user communication device which communicates with the user satellite,
each of the communication satellites arranged on the plurality of orbital planes includes,
when the communication satellite passes northward above the equator with a +X axis direction oriented to a plus direction in right-handed coordinates being taken as a satellite forwarding direction +X of the communication satellite and a +Z axis direction oriented to a plus direction in the right-handed coordinates being taken as a geocentric direction +Z of the communication satellite,
a first optical communication terminal as one of the inter-satellite communication devices to perform optical communication with another front communication satellite in a flying direction on the same orbital plane,
a second optical communication terminal as one of the inter-satellite communication devices to perform optical communication with another rear communication satellite in the flying direction on the same orbital plane,
a third optical communication terminal as one of the inter-satellite communication devices to perform optical communication with another communication satellite flying northeast of an east-side adjacent orbit, and
a fourth optical communication terminal as one of the inter-satellite communication devices to perform optical communication with another communication satellite flying southwest of a west-side adjacent orbit,
an Azimuth communication visual field of the third optical communication terminal is equal to or more than ±90 degrees with respect to the satellite forwarding direction +X,
an Azimuth communication visual field of the fourth optical communication terminal is equal to or more than ±90 degrees with respect to an opposite direction of the satellite forwarding direction +X,
the first optical communication terminal and the second optical communication terminal are arranged on an earth-oriented plane facing the earth, and
the third optical communication terminal, the fourth optical communication terminal, and the user communication device are arranged on a counter-earth-oriented plane, the counter-earth-oriented plane being a back plane of the earth-oriented plane and being a plane oriented to an opposite direction of the geocentric direction +Z, and
the user communication device is arranged at a position further in the opposite direction of the geocentric direction +Z than the third optical communication terminal and the fourth optical communication terminal.

14. The satellite information transmission system according to claim 13, wherein
one or more said communication satellites of the communication satellites arranged on the plurality of orbital planes have an earth communication device which communicates with an earth-side device positioned on the earth.

* * * * *